(12) United States Patent
Bair et al.

(10) Patent No.: US 6,233,573 B1
(45) Date of Patent: May 15, 2001

(54) SYSTEM AND METHOD FOR SELECTING ROWS FROM DIMENSIONAL DATABASES HAVING TEMPORAL DIMENTION

(75) Inventors: John Bair, Superior, CO (US); Charles M Bender, Rancho Santa Margarita, CA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/459,716

(22) Filed: Dec. 13, 1999

Related U.S. Application Data

(63) Continuation of application No. 08/964,764, filed on Nov. 5, 1997, now Pat. No. 6,003,024, which is a continuation-in-part of application No. 08/900,181, filed on Jul. 25, 1997, now Pat. No. 5,999,924.

(51) Int. Cl.[7] ................................................. G06F 17/30
(52) U.S. Cl. ................................................. 707/3; 707/102
(58) Field of Search ...................................... 707/1, 3, 102

(56) References Cited

U.S. PATENT DOCUMENTS

| | | | |
|---|---|---|---|
| 5,317,733 | 5/1994 | Murdock | 707/203 |
| 5,347,653 | 9/1994 | Flynn et al. | 707/203 |
| 5,359,724 * | 10/1994 | Earle | 707/203 |
| 5,428,774 | 6/1995 | Takahashi et al. | 707/101 |
| 5,440,730 | 8/1995 | Elmasri et al. | 707/203 |
| 5,548,754 | 8/1996 | Pirahesh et al. | 707/2 |
| 5,551,031 | 8/1996 | Cheng et al. | 707/2 |
| 5,557,791 | 9/1996 | Cheng et al. | 707/2 |
| 5,572,731 | 11/1996 | Morel et al. | 717/1 |
| 5,590,324 | 12/1996 | Leung et al. | 707/5 |
| 5,603,021 | 2/1997 | Spencer et al. | 707/4 |
| 5,745,775 * | 4/1998 | Covey | 707/203 |
| 5,905,985 * | 5/1999 | Mallory | 707/100 |
| 5,950,210 * | 9/1999 | Nelson | 707/203 |
| 5,970,476 * | 10/1999 | Fahey | 705/28 |

OTHER PUBLICATIONS

Rolem, D. "Physical Organization of Temoral Data", Proceedings of the Third International Conference on Data Engineering, Feb. 1987, PP 547–53.*

Freind, D. "Taking Databases into the next dimension." Computing Canada, Sep. 1992, vol. 18, No. 20, PP 40.*

Elmasri, R.A. and S.B. Navathe, Fundamentals of Database Systems, 1989, pp. 649–650, Benjamin/Cummings Publishing Company, Inc., Redwood City, California, USA.

Snodgrass, R.T., The Temporal Query Language TQuel, ACM Transactions on Database Systems, Jun. 1987, pp. 247–298, vol. 12, No. 2, Association for Computing Machinery, New York, New York, USA.

(List continued on next page.)

*Primary Examiner*—Jack Choules
(74) *Attorney, Agent, or Firm*—Charles E. Gotlieb

(57) ABSTRACT

A system and method selects rows from a fact table in a dimensional database containing a fact table, a time dimension table and other dimension tables. The other dimension tables each contain rows containing a time invariant attribute to identify an item described by the row, an effective time attribute for the row, and other attributes. If an attribute for an item changes, a new row is added to the dimension table containing the time-invariant attribute for the item and current attributes for the item, without deleting or overwriting any existing rows for that item. Such dimension tables can be selected or used to create other tables using one or more time attributes of the dimension tables. The tables created can be selected or used to create still other tables using one or more time attributes of those tables. One or more of the resulting tables or one or more tables created from a resulting table are then joined to a table in the dimensional database or a table created from a table in the dimensional database.

13 Claims, 18 Drawing Sheets

OTHER PUBLICATIONS

Snograss, R.T., S. Gomez and L.E. McKenzie Jr., Aggregates in the Temporal Query Language TQuel, IEEE Transactions on Knowledge and Data Engineering, Oct. 1993, pp. 826–842, vol. 5, No. 5, Institute of Electrical and Electronics Engineers, New York, New York, USA.

Snodgrass, R. T. (ed.), The TSQL2 Temporal Query Language, 1995, pp. 1–631, Kluwer Academic Publishers, Boston, Massachusetts, USA.

Snodgrass, R.T., M.H. Boehlen, C.S. Jensen and A. Steiner, Adding Valid Time to SQL/Temporal, ANSI X3J2–96–501r2, ISO/IEC HTC1/SC21/WG3 DBL MAD–146r2, Nov. 1996, pp. 1–77, International Organization for Standardization, Geneva, Switzerland.

Tansel, A., J. Clifford, S. Gadia, S. Jajodia, A. Segev and R.T. Snodgrass, Temporal Databases: Theory, Design, and Implementation, 1993, pp. 1–593, Benjamin/Cummings Publishing Company, Inc., Redwood City, California, USA.

Melton, J, Temporal (SQL/Temporal) ANSI TC X3H2 ISO/IEC JTC 21/WG 3 Database, Apr. 1997, pp 1–65 plus notes 1–21 and index 1–3, International Organization fort Standardization, Geneva, Switzerland.

* cited by examiner

FIG. 4B1

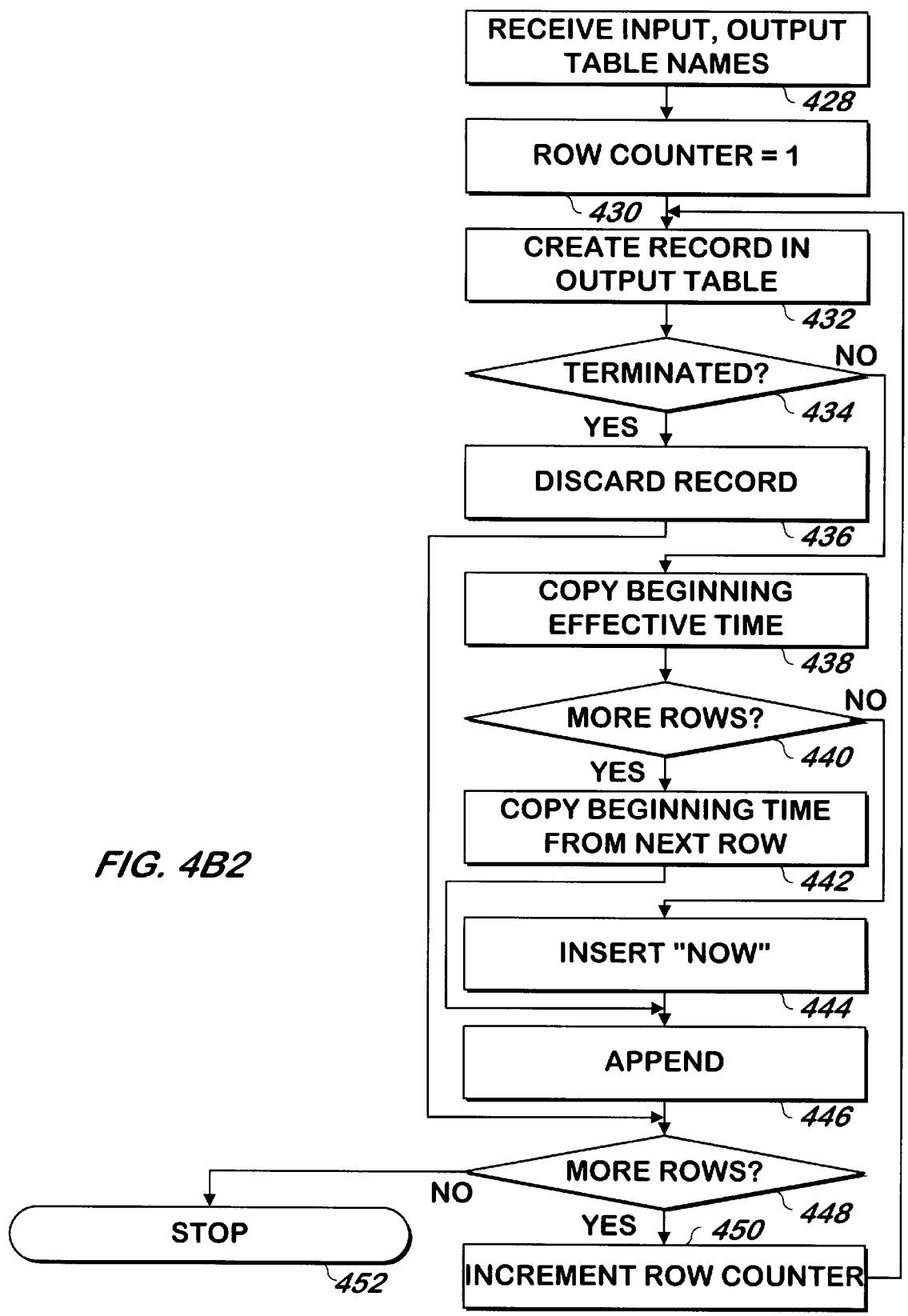
FIG. 4B2

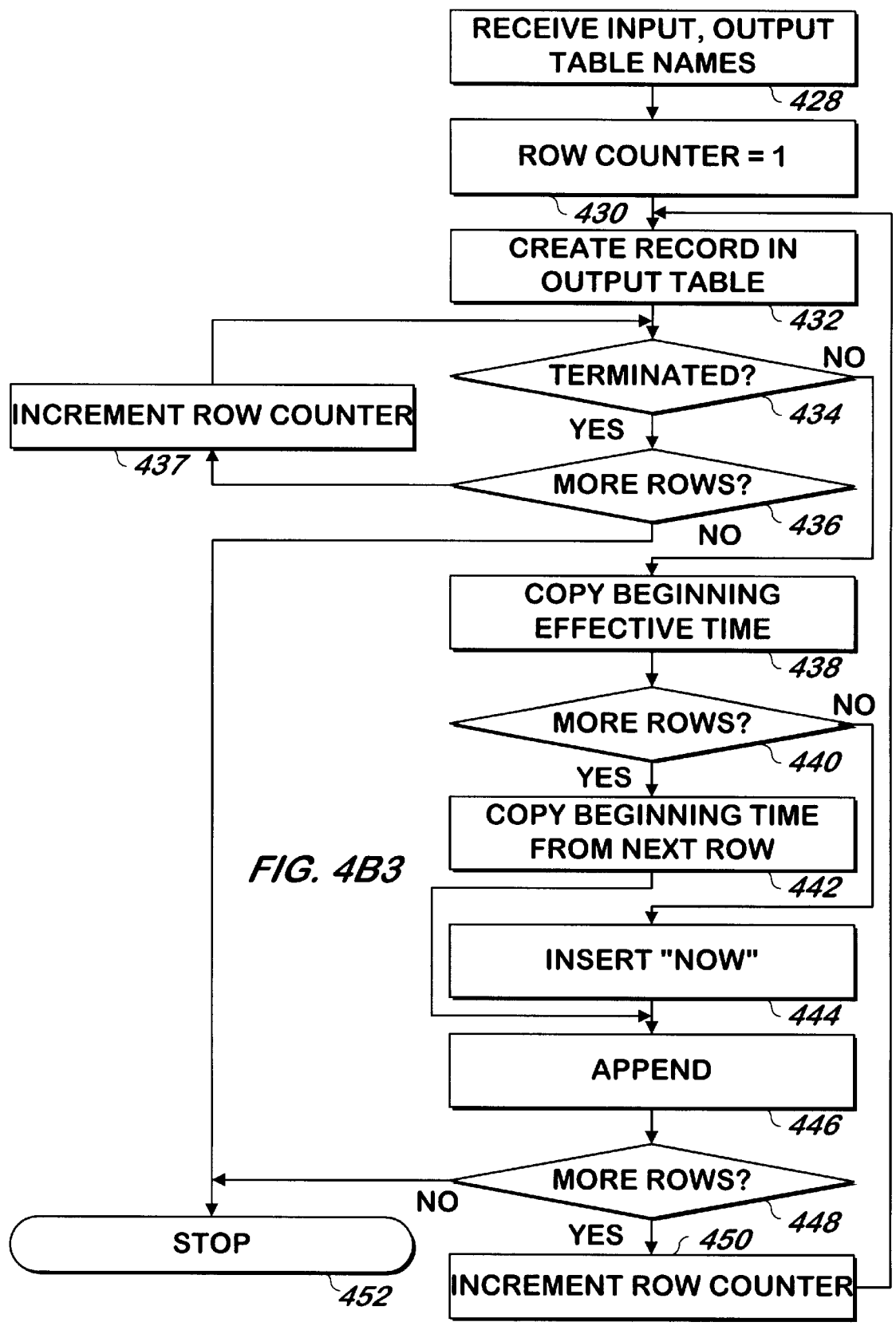
FIG. 4B3

SYSTEM AND METHOD FOR SELECTING ROWS FROM DIMENSIONAL DATABASES HAVING TEMPORAL DIMENTION

CROSS REFERENCE TO RELATED APPLICATIONS

This application is a continuation of application Ser. No. 08/964,764, U.S. Pat. No. 6,003,024 issued Dec. 14, 1999, entitled, "SYSTEM AND METHOD FOR SELECTING ROWS FROM DIMENSIONAL DATABASES" filed Nov. 5, 1997 by John Bair and Charles Bender, issued Dec. 14, 1999, which is a continuation in part of Ser. No. 08/900,181 filed Jul. 25, 1997, now U.S. Pat. No. 5,999,924 entitled, "Method and Apparatus for Producing Sequenced Queries" by John Bair and Richard Snodgrass issued Dec. 7, 1999, each having the same assignee as the present application and each is incorporated herein by reference in its entirety.

FIELD OF THE INVENTION

The present invention is related to database software and more specifically to database software for analyzing dimensional databases.

BACKGROUND OF THE INVENTION

Databases are used to store information. The data in a database may be stored in several tables, with each table storing a subset of the information in the database. Each table in the database is divided into one or more rows, with each row containing related information and/or one or more pointers to information in one or more different tables. The pointers, as well as the information to which the pointer points, are known as "keys." The other information in a row is referred to as the "attributes" of the row. Attributes are sometimes referred to as "columns" of the table.

One example of a database table is a customer table containing information about the customers of a business. The customer table might contain one row for each customer of a business, with the attributes describing the name, address, birth date and marital status of each customer.

A conventional "dimensional database" is a database made of three or more tables arranged in a particular manner. A dimensional database contains a fact table and two or more dimension tables, with each row in the fact table pointing to one or more rows in one or more dimension tables. The fact table may contain the data that is expected to change most rapidly, with the dimension tables storing data that changes less rapidly. For example, in a database that records orders for products, an order described in each row of the fact table might contain a pointer to the customer row in the customer table corresponding to the customer who placed the order. Each row in the fact table may also contain a key to a row in a product dimension table corresponding to the product in the order. Each row in the fact table may also contain a key to a row in a store dimension table corresponding to the store at which the order was placed. Additionally, each row in the fact table may contain a key to a row in a time dimension table corresponding to the date and time the order was placed. The "fact" recorded by the fact table is that an order was placed for a specific customer containing a specified product at a particular store at a stated time.

Referring now to FIG. 1A, such a dimensional database is illustrated. Fact table 100 stores fact records 102, each containing a time key, a product key, a customer key, and a store key described below. In addition, attributes containing the number of units of the product ordered are stored in the fact row 102.

A customer dimension table 120 stores one or more customer rows 122, containing information about each of the customers that may place orders for products using the fact table 100. Store dimension table 140 holds one or more store rows 142, containing information about the stores that may take orders for products. Product dimension table 130 contains one or more product rows 132, which hold information about each of the products that may be ordered. Each of the rows of the tables 120, 130, 140 contains a computer-generated integer key, or other form of key, unique within the table 120, 130, 140. To point to a row of one of these tables 120, 130, 140, the corresponding key in the fact table is set to the value of the key of the row.

Time dimension table 110 stores one or more time rows 112, each of which contains a key and an identifier of the date and time to which the index corresponds. For example, each time row 112 may contain a unique, computer-generated integer key or other form of key, and a date and time to a precision of one minute. The time dimension table 110 may be set up in advance to contain rows 112 corresponding to all possible values of time past, present, and future for a limited amount of time, such as a 10 year period.

The time key, product key, customer key, and store key in each row 102 of the fact table 100 are pointers to a row 112, 122, 132, 142 in the time dimension table 110, customer dimension table 120, product dimension table 130 or store dimension table 140, respectively.

A dimensional database may be implemented using a conventional relational database program such as the Oracle7.3 product commercially available from Oracle Corporation of Redwood Shores, Calif. or the Microsoft Access product commercially available from Microsoft Corporation of Redmond, Wash. View or Virtual databases may also be used, treating several databases as if they were a single database. Conventional relational databases with specialized tools for On-Line Analytical Processing, or OLAP-optimized databases may also be used. Such databases are sometimes referred to as MOLAP, ROLAP or DOLAP databases and are described at http://www.sentrytech.com/dw05dem.htm. Non-database implementations such as those storing data using objects, records, arrays or flat files may be used to implement dimensional databases. Keys may be implemented using conventional pointers or look-up table approaches.

A database program may generate some of the keys in fact row 102 automatically, with other keys selected by the person or program operating the database program. For example, when an order is placed, a new fact row 102 is generated in the fact table 100 by a person using, or a computer program interacting with, a database program. At this time, the time key may be selected by locating a time row in time dimension table 110 that most closely matches the system clock of the computer system on which the database program is running. The database program will write the index of this time row 112 to the time key in the fact row 102. The store key may be pre-filled in to correspond to the store row 142 in the store dimension table 140 corresponding to the store at which the order is being placed. The person or program interacting with the database program adds the customer key to the fact row by selecting a row in the customer dimension table 120 corresponding to a name or customer number provided by the customer.

The person or program then selects a product from the product dimension table 130 and signals the database program to enter the corresponding product key of the corresponding product row 132. The person or program then selects the number of units for the product designated by a product key which is stored in the fact row, thereby completing the order in the fact table 100.

Conventional dimension tables 110, 120, 130, 140 may change quite slowly in relation to the fact table 100. For example, a customer row 122 may contain fields for marital status and address. The customer table 120 may only change when a customer is added, or an existing customer changes his or her name, marital status or address, while many orders are expected each hour in the fact table 100.

Conventional dimensional databases may be implemented with a temporal fact table 100. A "temporal table" is a table that maintains historical information in addition to current information.

Unlike the fact table 100, many conventional dimensional database dimension tables 120, 130, 140 are not temporal tables. If a customer changes his or her address or gets married or divorced, the old information in the customer dimension table is replaced with current information. Because the dimension tables 120, 130, 140 are not temporal, changes to the data in these tables 120, 130, 140 can produce inaccurate results when the database is later queried. For example, if a customer changes his or her marital status, the database program may simply update the customer row 122 for that customer in the customer dimension table 120, deleting the old value of the marital status attribute and replacing it with the new value. Because the customer's marital status is not preserved over time, queries to the dimensional database 100 that depend on time of a change or an effective date of a customer's marital status will be inaccurate. For example, if a customer places an order while the customer is single, and then changes his or her marital status to "married", querying the fact table 100 for orders placed by single customers will omit the fact row 102 corresponding to the order placed when the customer was single.

Several solutions have been attempted to record changes in data related to the dimension tables 120, 130, 140 without causing those tables to become excessively large in size. For example, another row in the customer dimension table 120 may be added each time a change is made to the information for customer. Subsequent orders made by the customer point to the new customer row 122. However, such solutions have not recorded the time of the change. Because only the rows of the fact table 100 record any indication of when a change is made, when a query is performed on the database, the first order to be placed by that customer after the change was made may erroneously be identified as the best indication of the time of that change. Such inaccuracy prevents accurate queries from being made to the database, such as a list of all orders placed within one month of a change of a marital status.

Another attempted solution is to add storage for an old value of an attribute for some or all of the attributes stored by each row 122, 132, 142 in the dimension tables 120, 130, 140. Such an arrangement allows an attribute to be updated, while preserving the old value of the attribute. However, this attempted solution does not store more than one older value of each attribute, does not store the time of the change and may require re-programming of the applications accessing the data in the database to implement. Such an attempted solution will not allow queries to be made to the database that depend on the time of the change or effective date of a value of an attribute.

A system and method are therefore necessary that can accurately select records from a dimensional database that depend on a time of a change or effective date of a value of an attribute in a table of a dimensional database.

SUMMARY OF INVENTION

A system and method selects records from a fact table of a dimensional database. The dimensional database contains the fact table, a time dimension table and one or more other dimension tables. Each of the other dimension tables contain rows, with each row containing a time invariant attribute that relates the row to the item the row describes, one or more effective time attributes that describe the effective time of the data in the row, and other attributes. To change an attribute in one of these other dimension tables, a row is added to the table with the time invariant attribute of the item being described, and the other attributes are updated as necessary. The effective time attribute or attributes of the new row, and optionally an ending effective time attribute of the most recent historical row, are updated so that the table reflects the effective time of the new and historical rows.

Temporal query primitive functions may then be applied to the dimension tables. Temporal query primitive functions select rows from dimension tables, or create new tables, based upon one or more of the effective time attributes, other attributes of the dimension tables or both. The resulting tables may then be joined to one or more of the dimensional database tables to select rows from one or more of the dimensional database tables.

BRIEF DESCRIPTION OF THE DRAWINGS

FIG. 4B1 is a flowchart illustrating a method of performing a temporal projection on a table of a dimensional database that contains a beginning effective time attribute and a status attribute according to one embodiment of the present invention.

FIG. 4B2 is a flowchart illustrating a method of performing a temporal projection on a table of a dimensional database that contains a beginning effective time attribute and a status attribute according to an alternate embodiment of the present invention.

FIG. 4B3 is a flowchart illustrating a method of performing a temporal projection on a table of a dimensional database that contains a beginning effective time attribute and a status attribute according to an alternate embodiment of the present invention.

DETAILED DESCRIPTION OF A PREFERRED EMBODIMENT

Figure 1A:
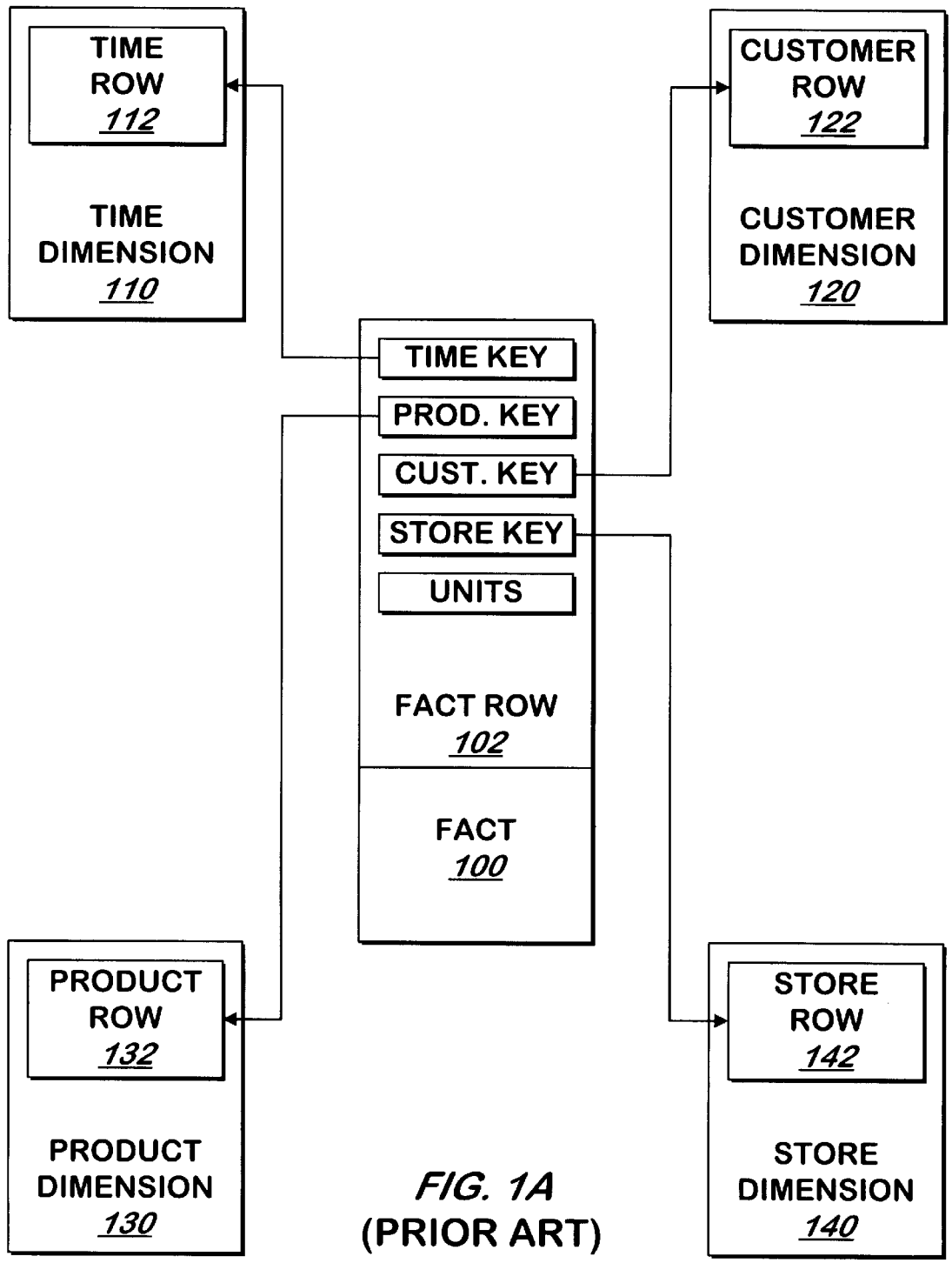
FIG. 1A is a block diagram illustrating a conventional dimensional database.
Figure 1B:
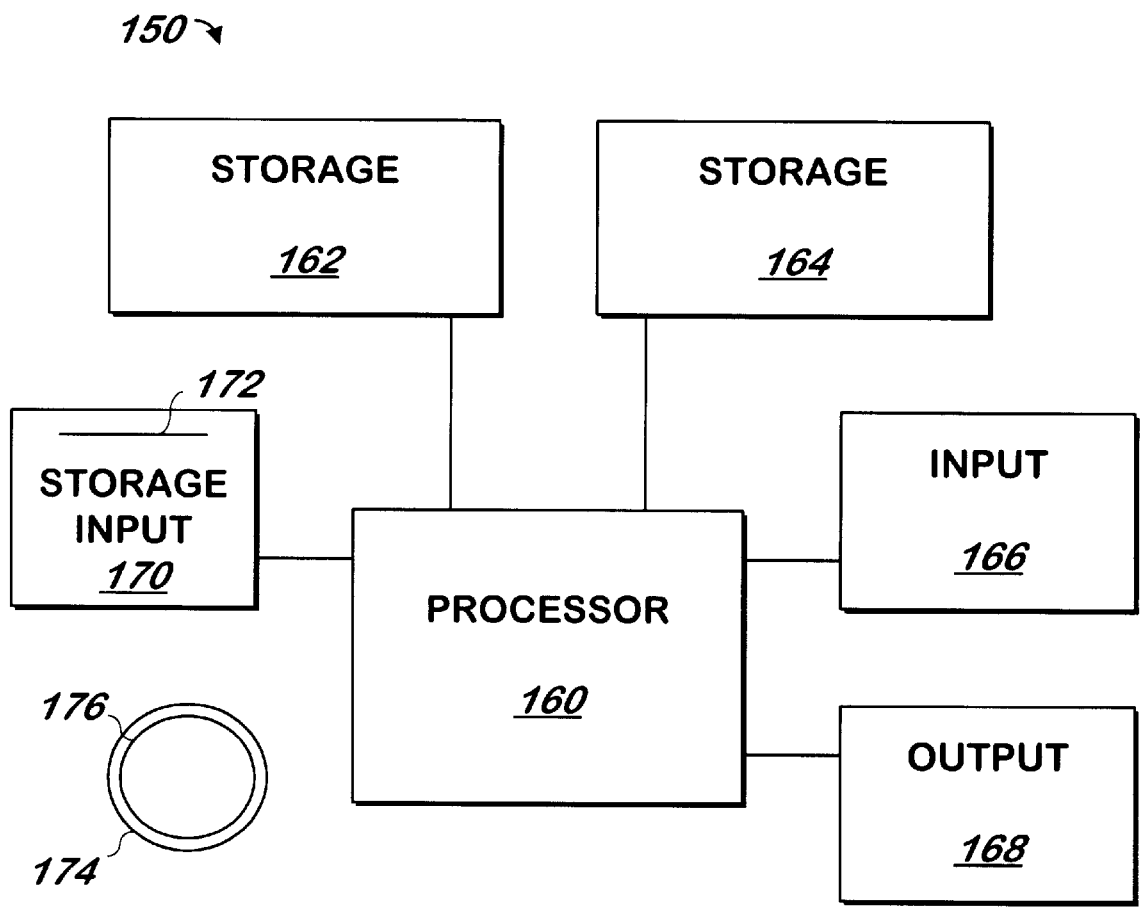
FIG. 1B is a block schematic diagram of a conventional computer system.

The present invention may be implemented as computer software on a conventional computer system. Referring now to FIG. 1B, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Compaq Deskpro 6000 computer running the Windows NT operating system commercially available from Microsoft Corporation of Redmond, Wash., although other systems may be used.

Figure 1C:
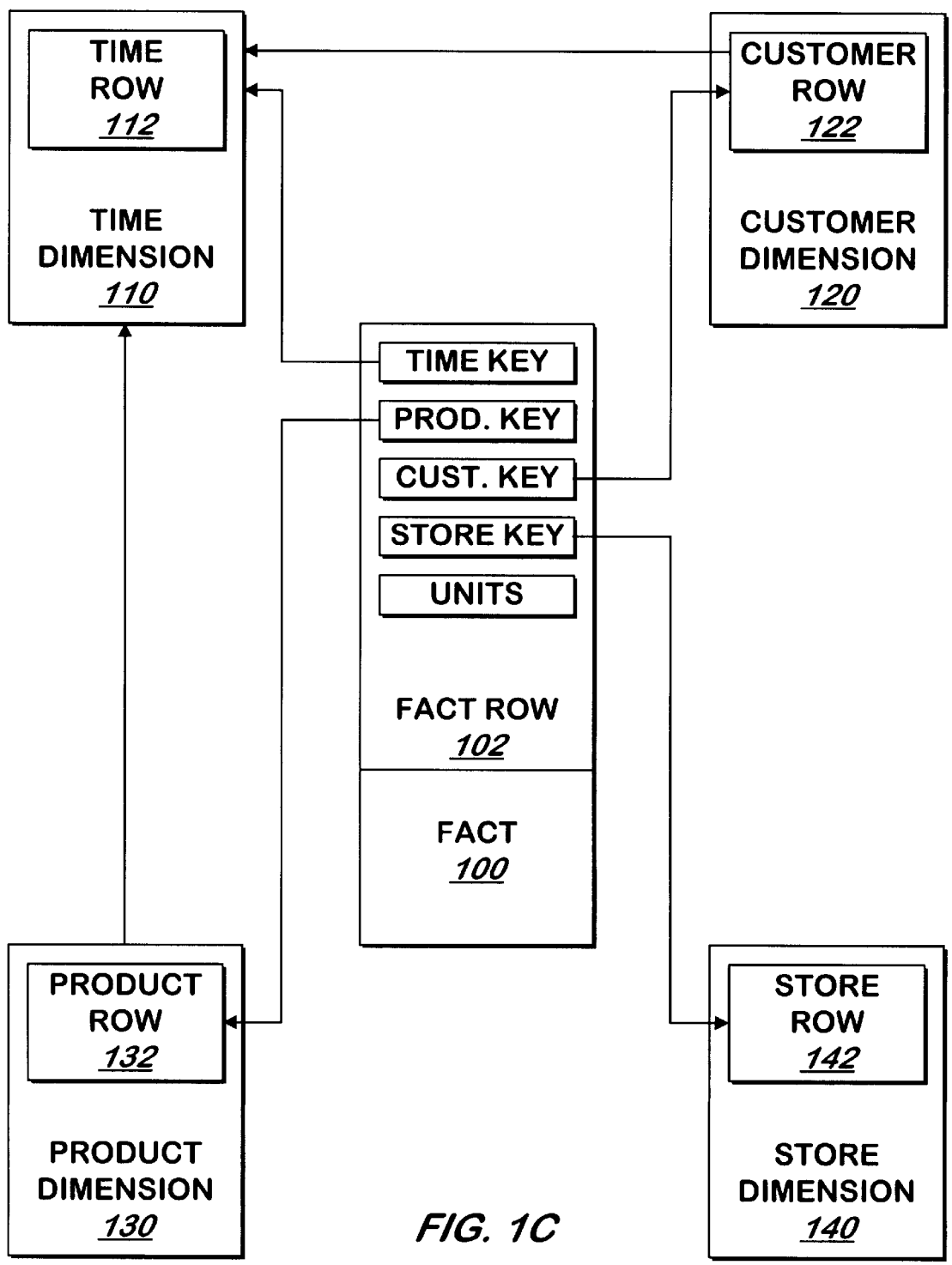
FIG. 1C is a block diagram illustrating a dimensional database according to one embodiment of the present invention.

Referring now to FIG. 1C, a dimensional database arranged according to one embodiment of the present invention is shown. Any of the implementations of a dimensional database described above may be used to implement the present invention. The dimensional database is arranged similar to that shown in FIG. 1A. However some of the dimension tables 120, 130 are joined to the time dimension table 110. The time dimension table 110 has a resolution equal to the smallest resolution required by the tables 100, 120, 130 joined to it. In one embodiment of the present invention, all dimension tables 120, 130, 140 are joined to the time dimension table 110 except the time dimension table 110 itself.

Figure 2:
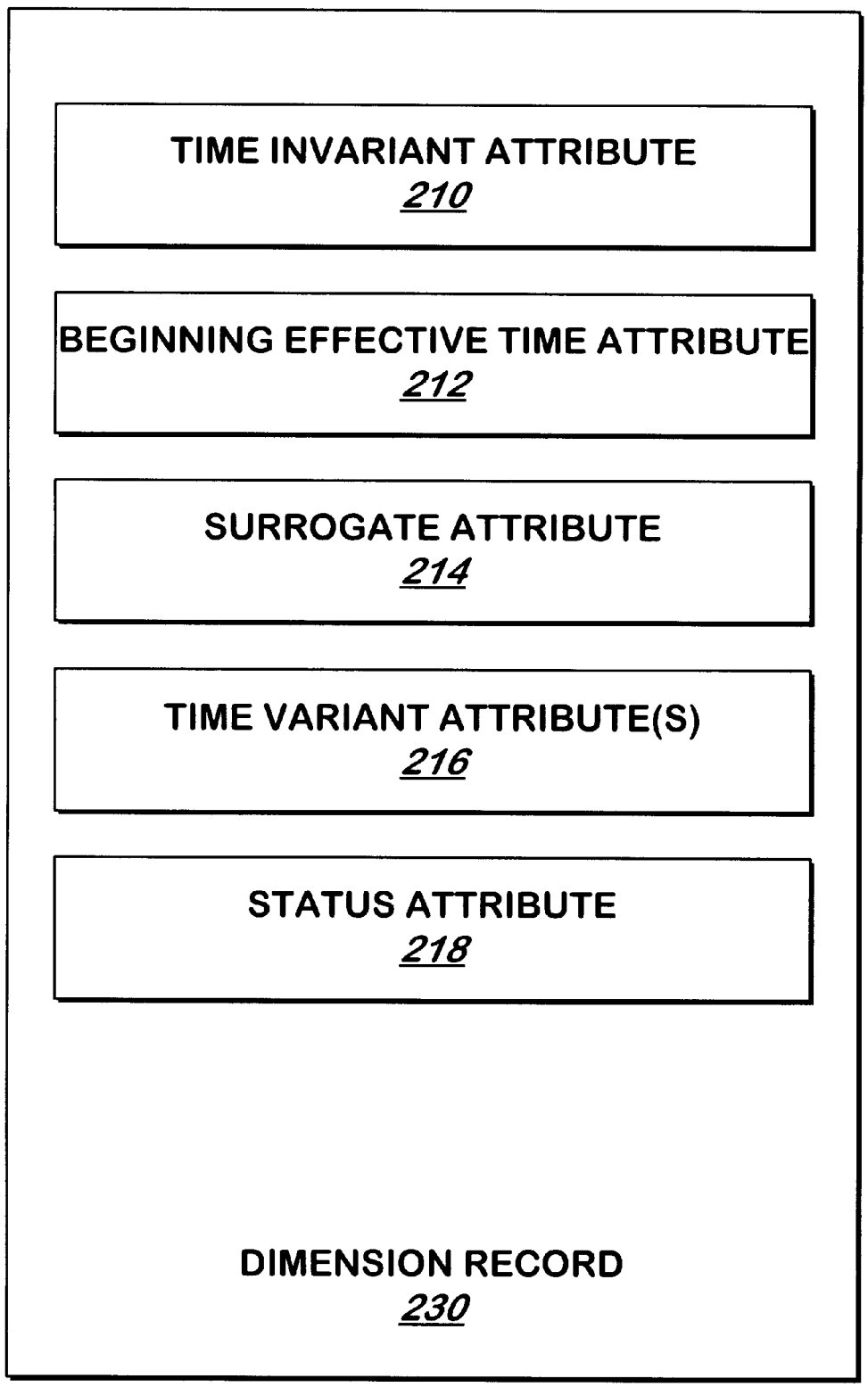
FIG. 2 is a block diagram illustrating a dimension record according to one embodiment of the present invention.

Referring now to FIG. 2, a record for use as a row in a dimension table or fact table is shown according to one embodiment of the present invention. The record shown in FIG. 2 would ordinarily not be used as a row in a time dimension table, although the present invention will operate with such rows in the time dimension table. As used herein, the term "record" denotes the collection of data that when inserted into a table, will become a row of the table.

A time invariant attribute 210 is assigned to the item described by the record 230. The time invariant attribute provides a reference to a single item. For example, if the dimension record 230 is a customer record, the time invariant attribute may be customer number assigned by the database program. The time invariant attribute 210 is unique to the item described by the record 230, however, as described below the time invariant attribute 210 may be duplicated in other records which describe the same item.

A beginning effective time attribute 212 is also a part of the dimension record 230. In one embodiment, beginning effective time attribute 212 holds a key to a time row in the time dimension table. Beginning effective time attribute 212 describes the time at which the record 230 begins its effectiveness. For example, beginning effective time attribute might describe the day on which a customer changed his or her marital status. An ending effective time attribute (not shown) may also be a part of the record as described below, or it can be inferred using the beginning effective time attribute 212 of the row having the next highest beginning effective time attribute and the same time invariant attribute.

In an alternative embodiment of the present invention, attribute 212 is an ending effective time attribute. In such embodiment, the beginning effective time may be inferred using the ending effective time of the record having an ending effective time attribute 212 that precedes most closely the ending effective time attribute 212 of the row 230 and contains the same time invariant attribute 210.

In one embodiment, if an ending effective time attribute is used in a dimension record, the ending effective time attribute references the first time row in the time dimension table on or after the actual ending effective time of the record. In another embodiment, the ending effective time attribute references the last time row in the time dimension table on or before the actual ending time of the record. As long as any applications which use the information in the record correctly handle the ending effective time, either approach may be used, although it can simplify programming of such applications if the approach is consistently used across all tables of the database.

An optional surrogate attribute 214 may also be used. The surrogate attribute 214 may be used as a key to the table in which the record is inserted. As such, each record contains a value different from the surrogate attribute of the rows of the table into which it will be inserted. In one embodiment, the surrogate attribute is assigned a value that is a function of the time invariant attribute 210 and the beginning effective time attribute 212. The function may be a concatenation of the two attributes in one embodiment. If no surrogate attribute is used, the time invariant attribute and the beginning effective time attribute may be used as a key to the table into which the record will be inserted. However, some databases do not perform joins as efficiently using two attributes as a key, and therefore, the use of a surrogate attribute can be more efficient.

One or more time variant attributes 216 may be stored as part of the dimension record 230. Time variant attributes are any attributes for an item that will change over time, for example a customer's name, address and marital status.

An optional status attribute 218 is also stored as a part of the dimension row 230. The status attribute 218 has a value of null if the item described by the dimension record 230 is still considered to be part of the database. The status attribute 218 has a non-null value indicating 'terminated' if the item described by the dimension record 230 is not considered to be active in the database. For example, if a person ceases being a customer, the status attribute is set to 'terminated' in a dimension record to be inserted as a row in the customer table with the beginning effective time attribute 212 describing the date person ceased to be a customer and the time invariant attribute equal to the time invariant attribute used in the other rows describing that customer.

If an attribute for an item changes, the current row for the item remains in the database table unchanged. In addition, a new record is created and added as a new row to the table. The new row allows all the old values of the unchanged attributes to be maintained, and the beginning effective time attribute 212 of the new row or the ending effective time of the most recent row preceding the new row maintains the effective time of change for use as described below.

Figures 3A, 3B:
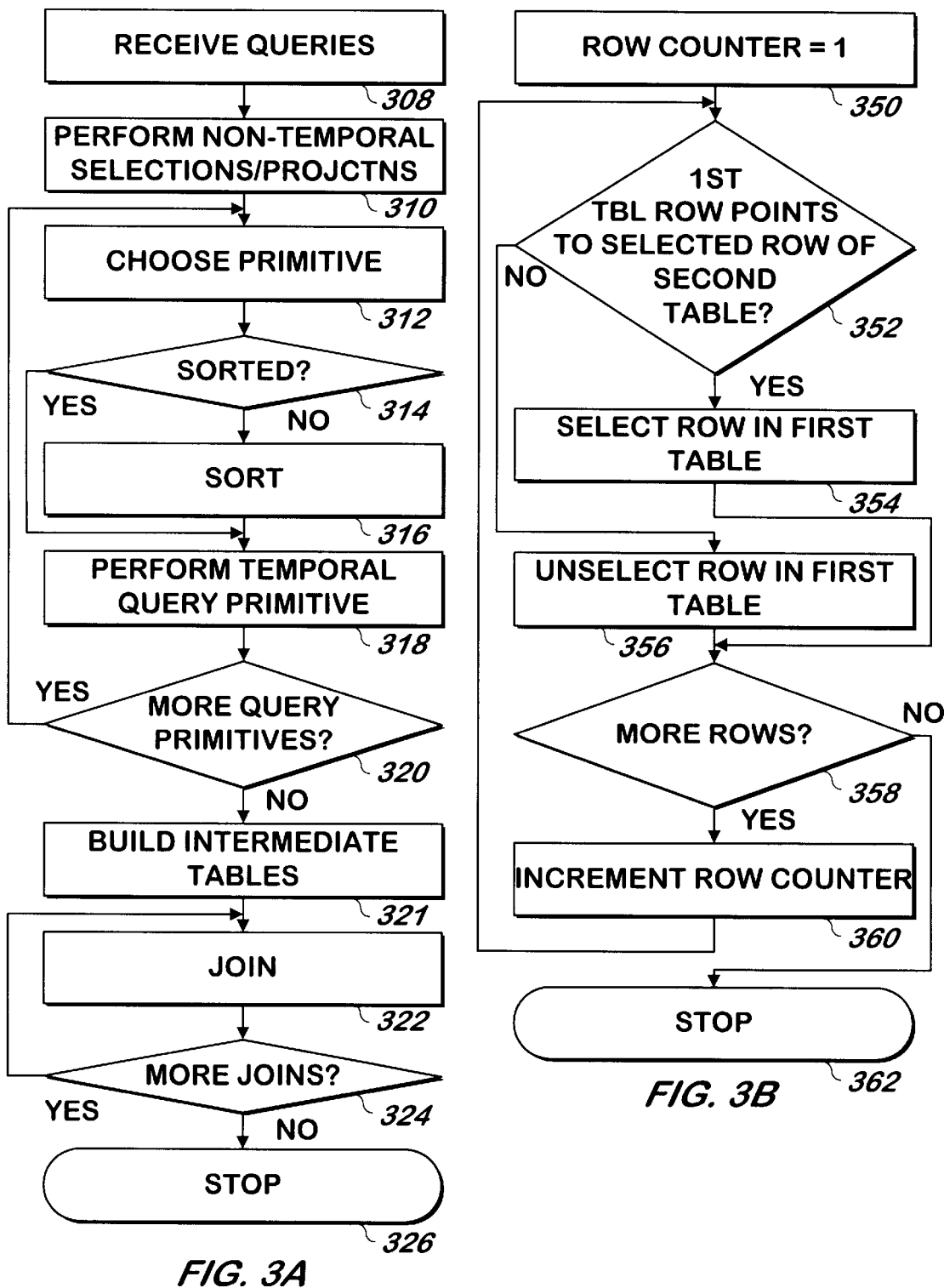
FIG. 3A is a flowchart illustrating a method of performing one or more temporal query primitive functions and one or more joins on the tables of a dimensional database according to one embodiment of the present invention.
FIG. 3B is a flowchart illustrating a method of performing a join on the tables of a dimensional database according to one embodiment of the present invention.

Referring now to FIG. 3A, a method of analyzing a dimensional database is shown according to one embodiment of the present invention. One or more temporal queries are received 308. A "temporal query" according to the present invention contains at least one statement to perform one or more temporal query primitive functions described in more detail below and at least one statement to perform one or more joins described in more detail below. The temporal query may optionally contain statements to perform conventional selections such as SQL selections, and may contain one or more statements to build one or more intermediate tables described in more detail below. If any non-temporal selections or projections are received, they are performed 310. Non temporal selections or projections are conventional selections or projections performed on one or more tables. Step 310 may be performed to reduce the number of rows in the tables in the dimensional database. Step 310 may be performed either before (as shown in the figure) or after step 318 or some selections may be performed before step 318 and some performed after step 318. In one embodiment, the choice of performing any non temporal selections before step 318 described below is made to cause the most restrictive operation to be performed first, thereby allowing the other operation to be performed more efficiently.

As described in more detail below, a temporal query primitive function uses a time attribute of the rows in a table to either select rows from an existing table, thereby reducing the number of rows that are selected in a table, or create a new table from an existing table, in such a manner that the new table has fewer rows than the existing table. The name of the existing table on which to perform the temporal query is received as a part of step 308. One of the query primitive identifiers received in step 310 is chosen 312. In one embodiment, step 312 is performed using conventional query parsing techniques, with operations performed in the order of the statement containing them, with innermost operations selected first.

The temporal query primitive functions described below may be performed on a table sorted as described herein. If the table corresponding to the query primitive identifier chosen in step 312 is not sorted 314, the existing table having the name specified in the query primitive chosen at step 312 is sorted 316. In one embodiment, the sort is specified as part of the temporal query received in step 308. The sort is performed in such a manner that all of the rows in the existing table having the same time invariant attribute are adjacent to one another, and that rows of the existing table with the same time invariant attribute are ordered in ascending order of the beginning effective time attribute or ending effective time attribute. For example, the existing table can be sorted in ascending order of time invariant attribute, with ties broken in order of ascending beginning effective time attribute. In one embodiment, the effective time attributes are integer indexes to the effective time, and are assumed to have the same relative order as the values of the times or dates corresponding to the keys. It is also possible to sort rows with the same time invariant attributes in descending order, and adjust the details of the method of the present invention accordingly.

In one embodiment, the table named in the temporal query primitive selected in step 312 is not physically sorted. Instead, an index is maintained which logically orders each row of the table as described above. The temporal query primitive functions described below operate on the rows of the table in the order of the index.

As described in more detail below, a temporal query primitive function corresponding to one of the statements received as a part of the query received in step 310 and chosen in step 312 is performed 318 on the fact table or one or more dimension tables of a dimensional database, either as originally provided or as selected in step 308. If additional temporal query primitive functions were received 320 in step 312, the method continues at step 312 by selecting a different temporal query primitive identifier until all of the temporal query primitives received in step 310 are performed.

If the temporal query received in step 308 contain statements that cause intermediate tables to be built, described below, the intermediate tables are built 321. As described in more detail below, intermediate tables are tables built using the result of a temporal query primitive performed in step 318, either by conventional selection, projection or join techniques.

One or more tables are then joined 322 to other tables as described in more detail below. The tables joined in step 322 can be any one or more tables from the dimensional database, as it existed originally, or as selected in step 310, a result of a query primitive performed in step 318, an intermediate table built in step 321 or the result of a join performed in step 322.

Referring now to FIG. 3B, a method of joining a first table with a second table is shown according to one embodiment of the present invention. FIG. 3B illustrates step 322 of FIG. 3A. It can be helpful to understand the structure of a database table to understand how the method of FIG. 3B operates.

A database table may have certain rows that are "selected" and other rows that are not selected. The selected rows may be distinguished from the unselected rows in a variety of ways. In one embodiment, each row in the table is pointed to using arrays or dynamic arrays, with one array for each index of the table. Two ways of selecting rows in a table are possible. The first way creates a new table name. If rows of the table are selected, new arrays in the order of the old arrays but pointing only to the selected rows of the table may be generated and references to the new table name will use the new arrays. Another way of selecting rows in a table is to maintain a separate "unselected" array containing pointers to the rows in the table not corresponding to the selection criteria. Rows of a table not selected are removed from the array corresponding to the table name and placed into the unselected array. References to the table name do not include the rows on the unselected array.

To join a first table with one or more second tables, a row counter is initialized to a value of '1' to designate a "current" row in the database 350. If the first table contains a reference to a row in a second table that is not selected 352, the row in the first table is unselected 356 as described above, and otherwise the row is selected 354. If there are more rows in the table 358, the row counter is incremented 360 and the method continues at step 352. Otherwise, the method terminates 362.

In addition to the join described above with reference to FIG. 3B, the present invention can utilize joins implemented using other methods such as Cartesian product joins or sort joins. These joins are described in Mannila & Raiha, "The Design of Relational Databases," (Addison Wesley, 1992, ISBN 0-201-56523-4).

Temporal Query Primitive Functions

In one embodiment, temporal query primitive functions performed in step 318 of FIG. 3A include temporal projection, temporal selection, temporal normalization, state duration, transition detection and any other conventional temporal query functions. Temporal projection, temporal selection, temporal normalization, state duration and transition detection are described below.

Temporal Projection

Temporal projection creates from an input table, an output table describing the effective start and stop times of the rows in the input table. The input table may be a fact table, dimension table, a result of a different temporal query primitive, the result of a join, any tables selected from such tables or any other table in which each row has some or all of the attributes in the record described above with reference to FIG. 2. The output table created using temporal projection has the same number of rows as the input table. The output table contains two attributes, also referred to as "columns", a beginning effective time, and an ending effective time. Temporal projection may be performed according to the structure of the rows in the input table.

Figure 4A:
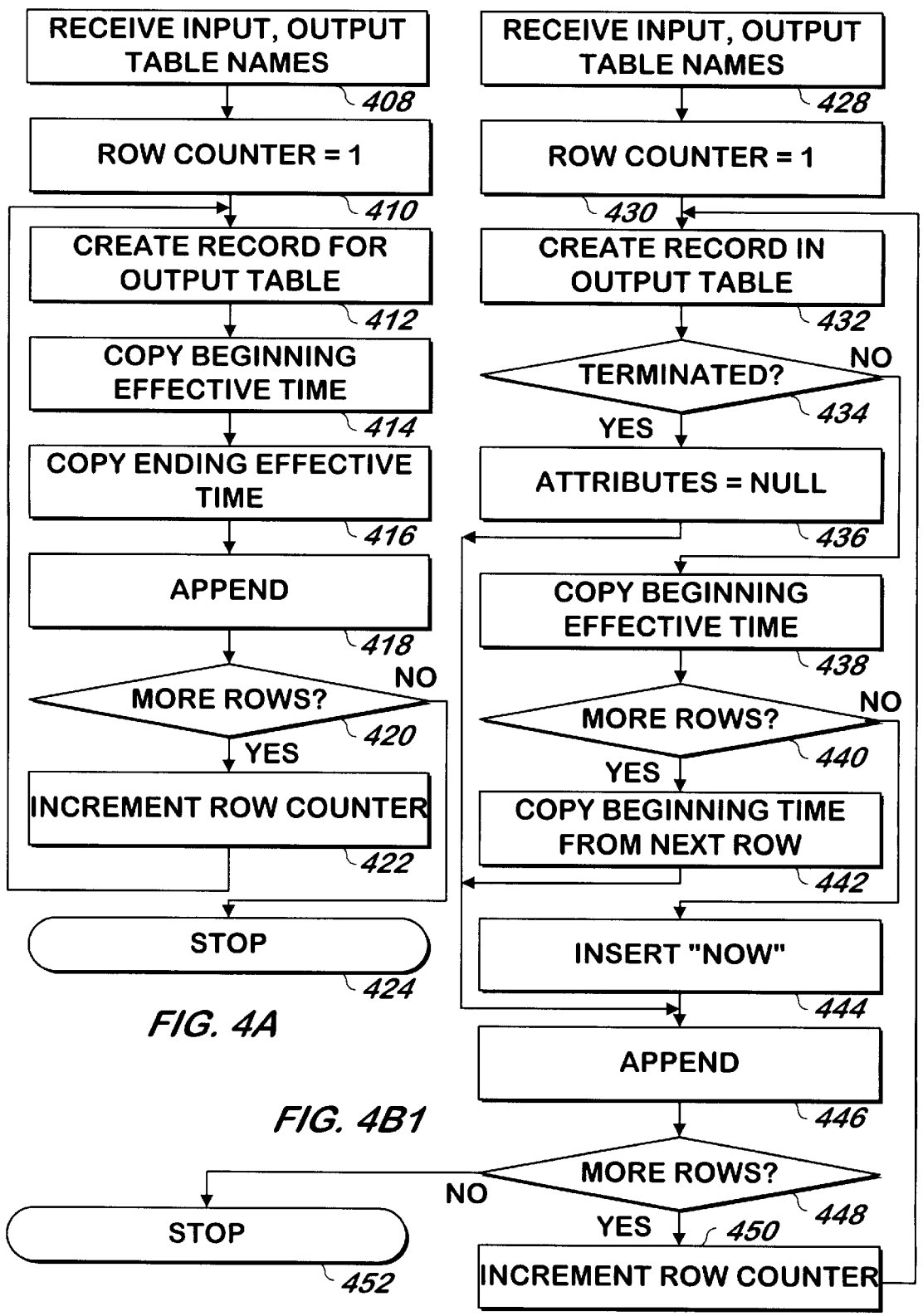
FIG. 4A is a flowchart illustrating a method of performing a temporal projection on a table of a dimensional database that contains a beginning effective time attribute and an ending effective time attribute according to one embodiment of the present invention.

Referring now to FIG. 4A, a method of implementing temporal projection is shown according to one embodiment of the present invention. The method shown in FIG. 4A is used in one embodiment if the rows in the input table contain both beginning and ending effective time attributes. The table names to be used as the input and output tables are received 408. A row counter, used to designate a row in the input and output tables as the "current row" is initialized to a value of '1' 410. A record to be inserted as a row in the output table is created 412. The beginning effective time and ending effective time attributes from the row in the input table corresponding to the row counter are copied 414, 416 into the beginning effective time and ending effective time columns of the record created in step 412. The record created in step 412 and modified as described in FIG. 4A is then appended 418 as a row at the end of the output table. As used herein, "append" can include creating a table if necessary, and inserting the record into the end or elsewhere in the table. If at least one additional row exists in the input table past the row corresponding to the row counter 420, the row counter is incremented 422 and the method continues at step 412. Otherwise, the method terminates 424.

Referring now to FIG. 4B1, a method of implementing temporal projection is shown according to another embodiment of the present invention. The method shown in FIG. 4B1 is used in one embodiment if the rows in the input table contain both beginning effective time and status attributes. The names of the input and output tables are received 428. A row counter is initialized to a value of '1' 430. A record is created for use in the output table 432 having the same structure as the row created in step 412 of FIG. 4A. If the row in the input table corresponding to the row counter has a status attribute indicating the row has been terminated, both attributes in the record created in step 432 are set to null 434, 436, and the method continues at step 446. Otherwise, the beginning effective time from the row in the input table corresponding to the row counter is copied 438 into the beginning effective time column of the record created in step 432.

If a row exists that follows the row in the input table corresponding to the row counter and contains the same time invariant attribute as the row in the input table corresponding to the row counter 440, the beginning effective time attribute from the row following the row in the input table corresponding to the row counter is copied 442 and inserted as the ending effective time attribute of the record created in step 432. If such a row does not exist, an indicator corresponding to value of "now" is inserted 444 into the ending effective time attribute of the record for the output table created in step 432.

The record created in step 432 and modified as described in FIG. 4B1 is appended 446 to the end of the output table. If more rows exist in the input table following the row corresponding to the row counter 448, the row counter is incremented 450 and the method continues at step 432. Otherwise, the method terminates 452.

In another embodiment of the present invention shown in FIG. 4B2, the record created in step 432 is discarded 436 if the row in the input table corresponding to the row counter has a status attribute indicating the row has been terminated 434, and the method continues at step 448. In such embodiment, the number of rows in the output table will not equal the number of rows in the input table, making correlation between the rows of the input table and the rows of the output table more difficult. If desired, each of the records created in step 430 may be created with an extra attribute storing the row counter, or a key to the corresponding row of the input table, such as the surrogate key, may be copied into the record created in step 432 at step 438. The other steps shown in FIG. 4B2 operate as described above with respect to FIG. 4B1.

In still another embodiment of the present invention shown in FIG. 4B3, if the row in the input table corresponding to the row counter has a status attribute indicating the row has been terminated 434, if another row exists in the input table 436, the row counter is incremented 437 and the method continues at step 434, and if another row does not exist in the input table, the method terminates 452. The other steps shown in FIG. 4B3 operate as described above with respect to FIG. 4B1. The alternative embodiments of the method shown in FIGS. 4B2 or 4B3 are used in one embodiment if the rows in the input table contain both beginning effective time and status attributes.

Figures 4C, 5:
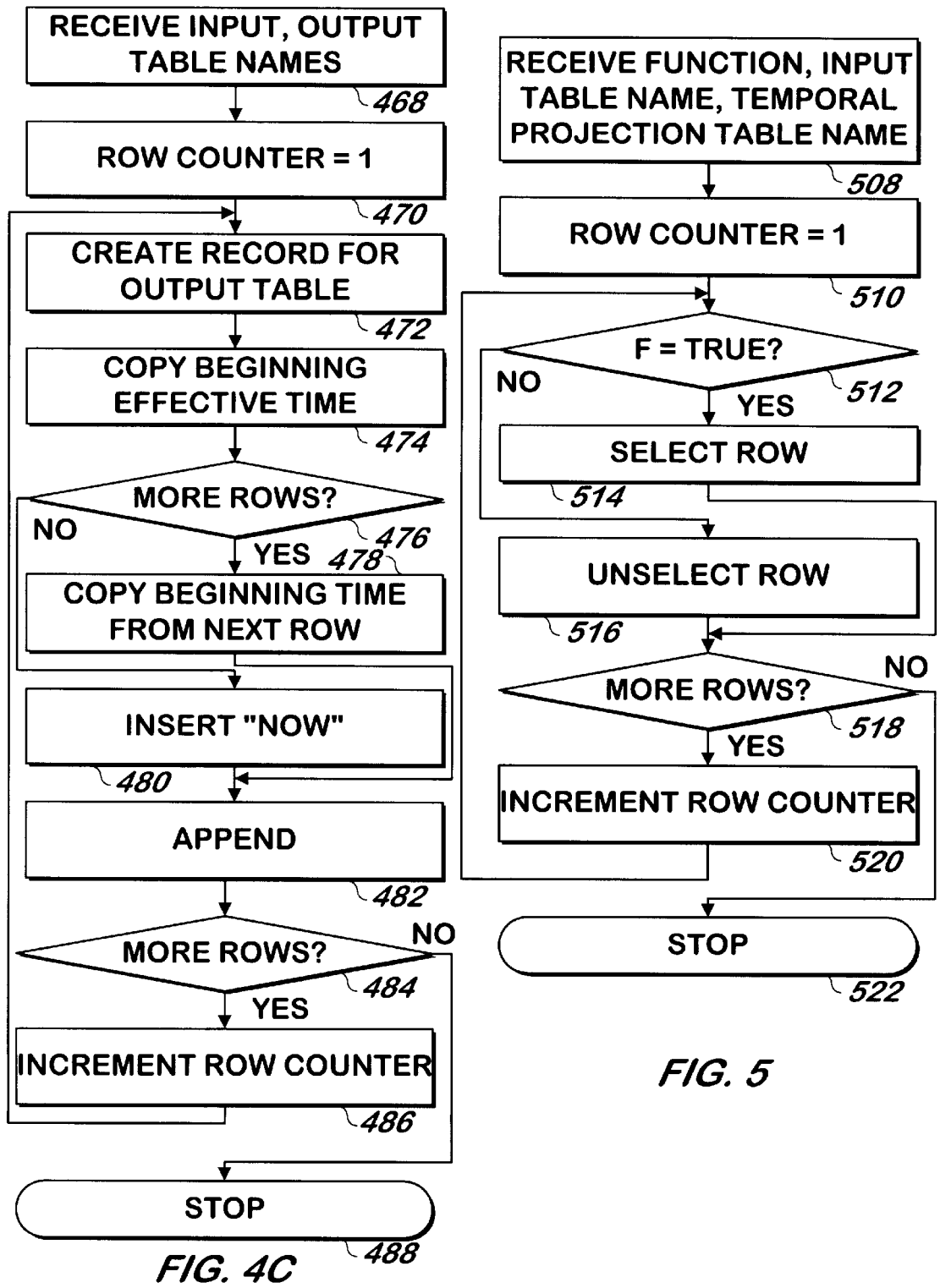
FIG. 4C is a flowchart illustrating a method of performing a temporal projection on a table of a dimensional database that contains a beginning effective time attribute according to one embodiment of the present invention.
FIG. 5 is a flowchart illustrating a method of performing a temporal selection on a table in a dimensional database according to one embodiment of the present invention.

Referring now to FIG. 4C, a method of implementing temporal projection is shown according to another embodiment of the present invention. The method shown in FIG. 4C is used in one embodiment if the rows in the input table contain a beginning effective time attribute, but no status or ending effective time attribute.

The input and output table names are received 468. A row counter is initialized to a value of '1' 470. A record is created for use in the output table 472 having the same structure as the row created in step 412 of FIG. 4A. The beginning effective time of the row in the input table specified in step 468 corresponding to the row counter is copied 474 into the row created in step 472. If a row exists in the input table following the row corresponding to the row counter and that row has a time invariant attribute equal to the time invariant attribute of the row in the input table corresponding to the row counter 476, the beginning effective time from the row following the row in the input table corresponding to the row counter is copied 478 into the ending effective time attribute of the record created in step 472. Otherwise, a value denoting "now" is inserted 480 into the ending effective time attribute of the record created in step 472. The record created in step 472 and modified as described above is appended 482 as a row to the end of the output table specified in step 468. If there are rows in the input table following the row corresponding to the row counter 484, the row counter is incremented 486 and the method continues at step 472. Otherwise, the method terminates 488.

Figure 4D:
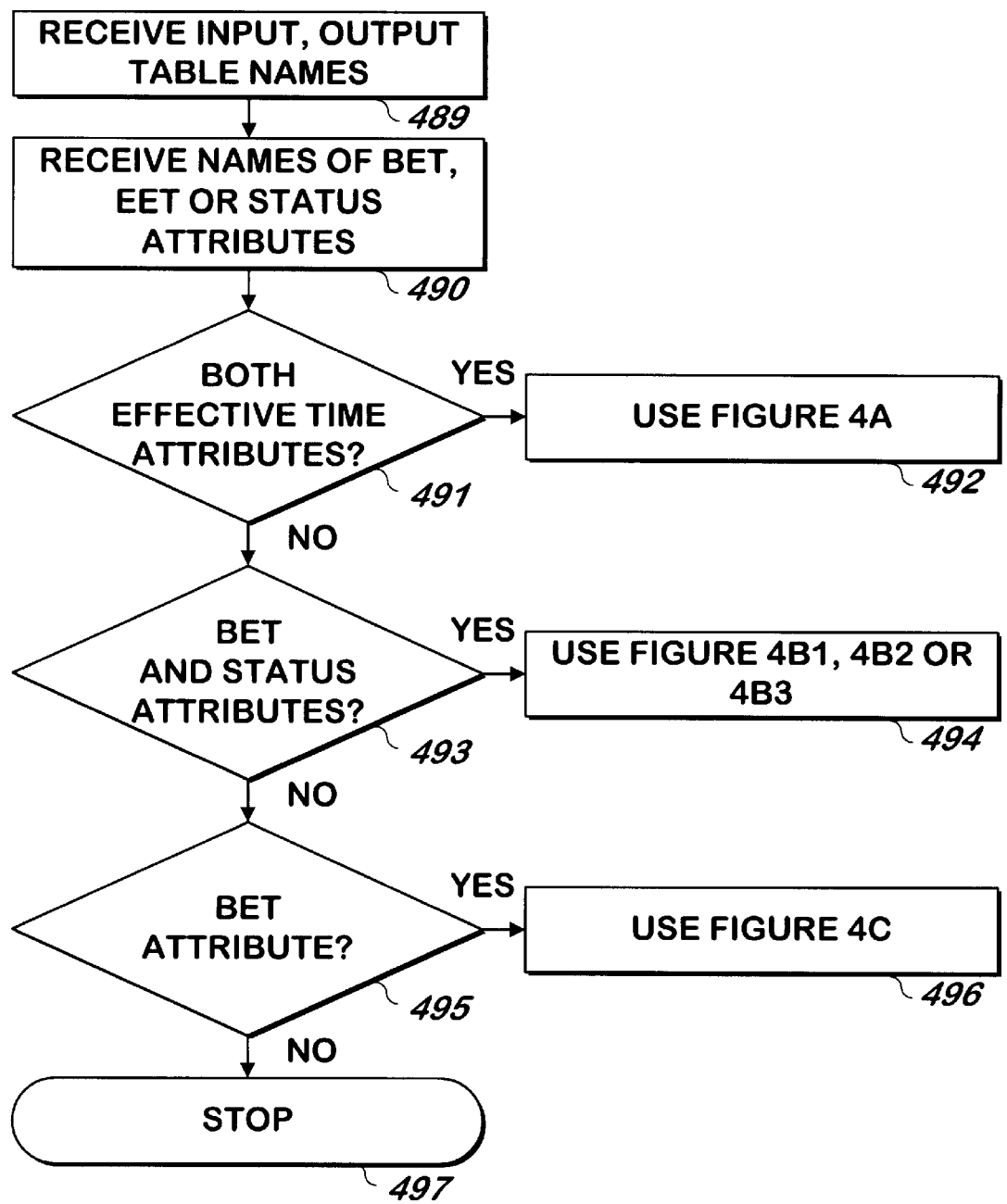
FIG. 4D is a flowchart illustrating a method of selecting a temporal projection to perform according to one embodiment of the present invention.

In one embodiment, the names or other identifiers of the beginning effective time attribute, ending effective time attribute or status attribute are received in addition to the names of the input and output tables. Selection from among the methods of performing temporal projection depends on which names are received. Referring now to FIG. 4D, a method of selecting a method of performing a temporal projection is shown according to one embodiment of the present invention. The names of the input and output tables are received 489. The names of the beginning effective time attribute, ending effective time attribute or status attribute are also received 490. In one embodiment, the names of any of these attributes that exist in the table are received as part of step 490 and the other names are omitted. If, in step 490, the names of both beginning and ending effective time attributes are received 491, the method described above with reference to FIG. 4A is used to perform the temporal projection 492. If, in step 490, the names of the beginning effective time attribute and status attribute are received 493, one of the methods described above with reference to FIGS. 4B1, 4B2 or 4B3 is used to perform the temporal projection 494. If, in step 490, the name of the beginning effective time attribute is received 495, the method described above with reference to FIG. 4C is used to perform the temporal projection 496. Otherwise, the method terminates 497.

Temporal Selection

Temporal selection may be performed on an input table that is either a dimension table, a fact table or any other table with each row having some or all of the attributes of the record described above with reference to FIG. 2. A method of temporal selection receives the name or other identifier of an input table, the name or other identifier of a temporal projection table corresponding to the input table and a Boolean function. A "temporal projection table" is an output table created by a temporal projection as described above. The Boolean function is applied to each row of the temporal projection table. If the function as applied is true, the corresponding row in the input table is selected. Corresponding rows in the input table for which the function is not true in the temporal projection table are not selected.

Referring now to FIG. 5, a method of performing temporal selection is shown according to one embodiment of the present invention. The function to be used for the temporal selection, the name or other identifier of the input table and the name or other identifier of the temporal projection table corresponding to the input table are received 508. A row counter is initialized to a value of '1' 510.

The function is applied to the row of the temporal projection table corresponding to the row counter and if the result of the function is true 512, the row in the input table corresponding to the row counter is selected 514 using any selection method described above. Otherwise, the row in the input table corresponding to the row counter is not selected 516 using any of the selection methods described above. If there are more rows in the temporal projection table beyond the row corresponding to the row counter 518, the row counter is incremented 520 and the method continues at step 512. Otherwise, the method terminates 522.

Temporal Normalization

Temporal normalization creates an output table that is a consolidated version of an input table. The input table can be a fact table, a dimension table, or any other table in which each row has some or all of the attributes of the record described above with reference to FIG. 2. Two or more rows of the input table having the same value of selected attributes and the same time invariant attribute are consolidated to a single row of the output table, provided the effective time attributes of such rows of the input table are contiguous in time. Rows are contiguous in time if no gaps exist between the ending effective time of one row and the beginning effective time of the row that is next in time. Temporal normalization may be performed differently depending on whether a status attribute exists in the input table, and whether an ending effective time attribute exists in the input table.

Figure 6A:
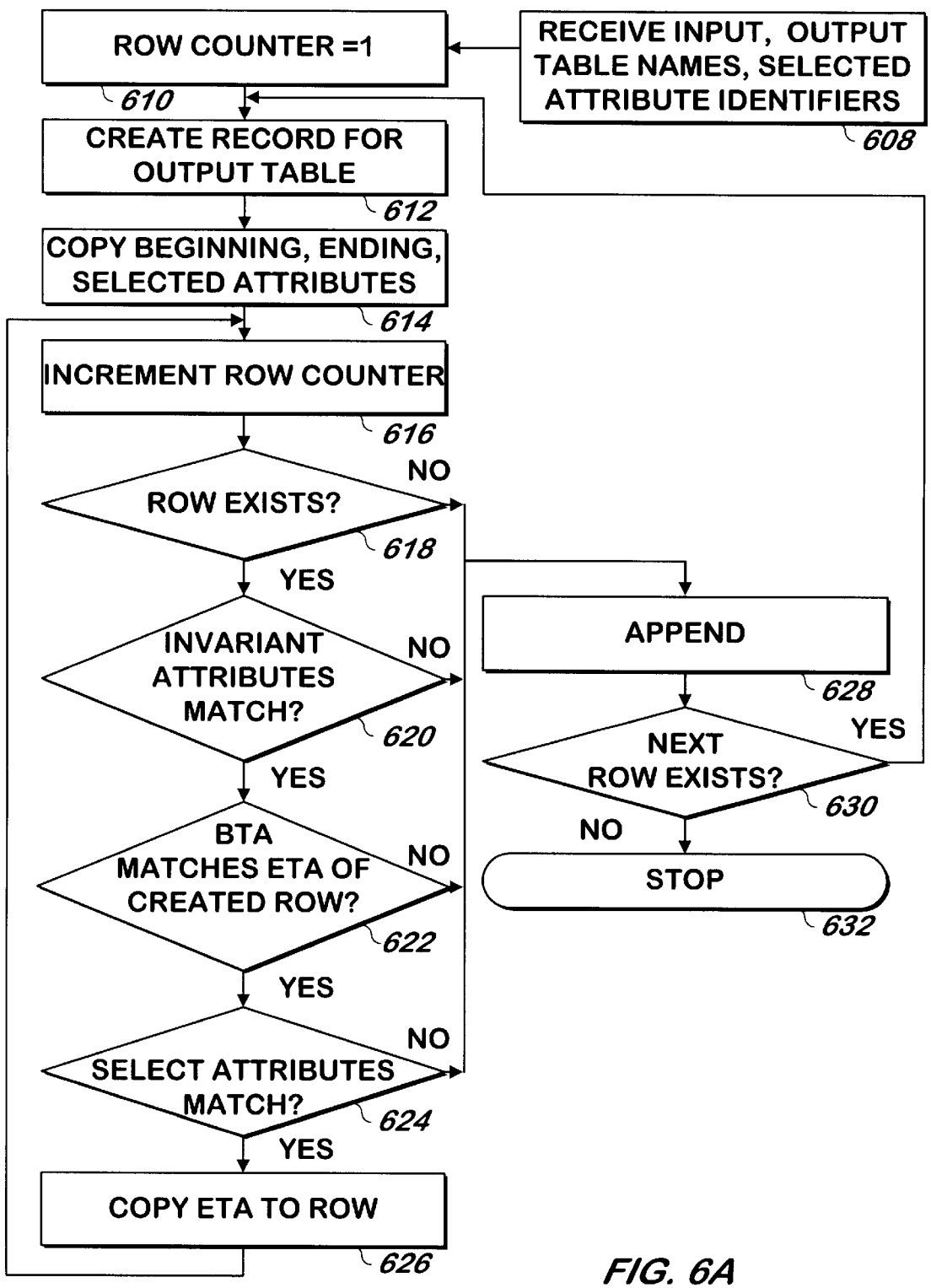
FIG. 6A is a flowchart illustrating a method of performing a temporal normalization on a table in a dimensional database containing a beginning effective time attribute, an ending effective time attribute according to one embodiment of the present invention.

Referring now to FIG. 6A, a method of temporal normalization is shown according to one embodiment of the present invention. The method of FIG. 6A is used if the input table does not contain a status attribute and does contain beginning and ending effective time attributes. The input and output table names, and identifiers of the attributes on which to normalize the input table are received 608. A row counter is initialized to a value of '1' 610. A record to be used as a row for the output table is created 612. In one embodiment, the record created contains space for a time invariant attribute, beginning and ending effective time attributes, and the selected attributes identified in step 608. Other attributes from the input table may also be a part of the record created in step 612.

The beginning and ending effective time attributes are copied 614 from the row in the input table corresponding to the row counter to the record created for the output table in step 612. In addition, the time invariant attribute and other attributes such as the selected attributes identified in step 608 are also copied from the same record of the input table to the record created in step 612.

The row counter is incremented 616. The row in the input table corresponding to the row counter is compared to the record created in step 612 as modified in step 614. If such a row exists 618, and the invariant attribute of the row in the input table corresponding to the row counter matches 620 the invariant attribute copied in step 614, and the beginning effective time attribute of the row in the input table corresponding to the row counter identifies the row corresponding to the row counter as contiguous in time to the ending effective time attribute copied in step 614, for example by matching, and the attributes corresponding to those identified in step 608 from the row in the input table corresponding to the row counter match 624 those copied in step 614, the ending effective time attribute of the row in the input table corresponding to the row counter is copied 626 into the ending effective time attribute of the row created for the output table in step 612, and the method continues at step 616. Otherwise, the record created in step 612 and modified as described in the FIG. 6A is appended as a row at the end of the output table 628. If the input table contains a row corresponding to the value of the row counter 630, the method continues at step 612. Otherwise, the method terminates 632.

Figure 6B:
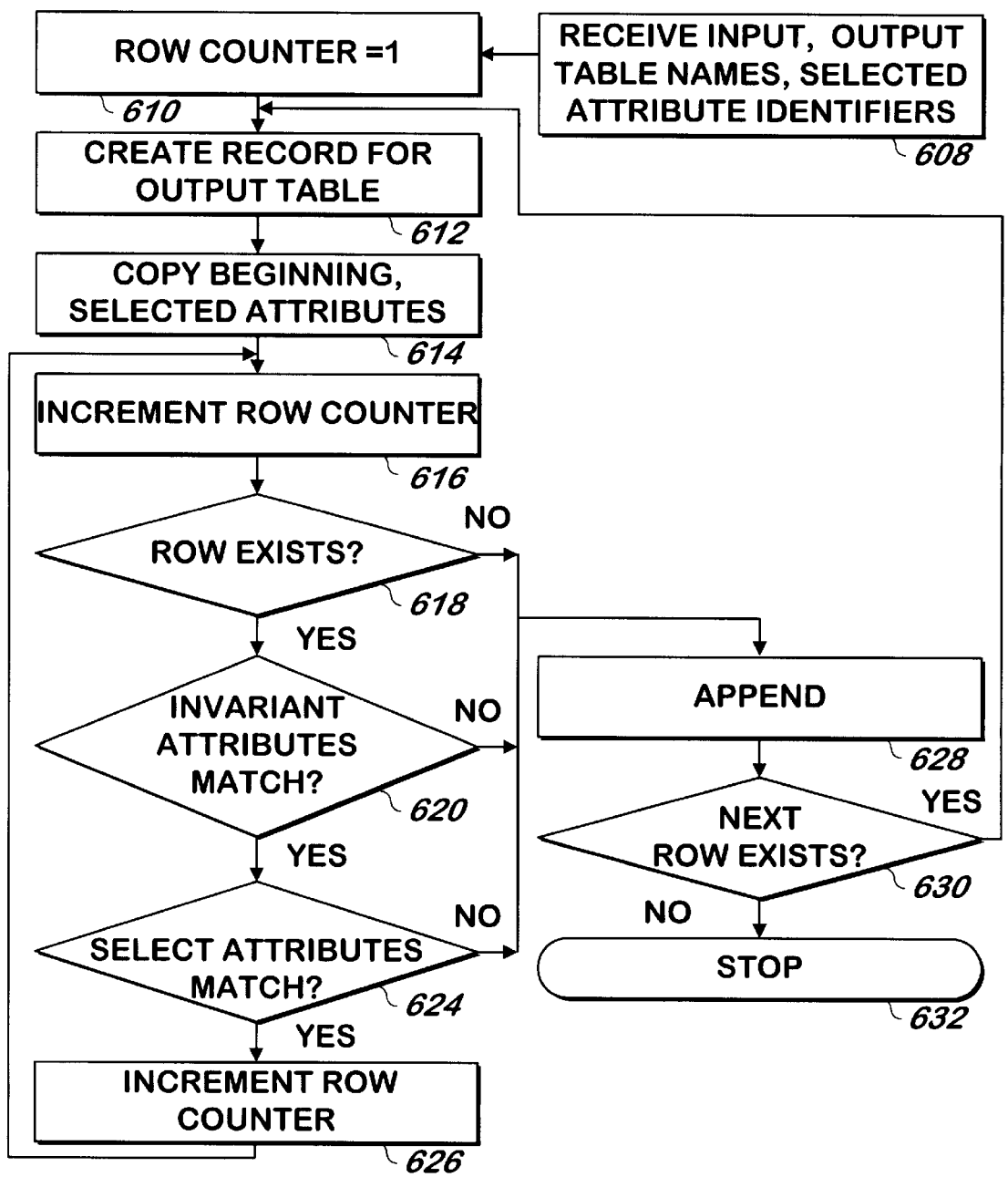
FIG. 6B is a flowchart illustrating a method of performing a temporal normalization on a table in a dimensional database containing a beginning effective time attribute according to one embodiment of the present invention.

If the input table does not contain an ending effective time attribute, the method described above with reference to FIG. 6A is used, however step 622 is omitted, and steps 614 and 626 do not copy the ending effective time attribute to the row created in step 612. This embodiment is illustrated in FIG. 6B with the remaining steps operating as described with reference to FIG. 6A.

Figure 6C:
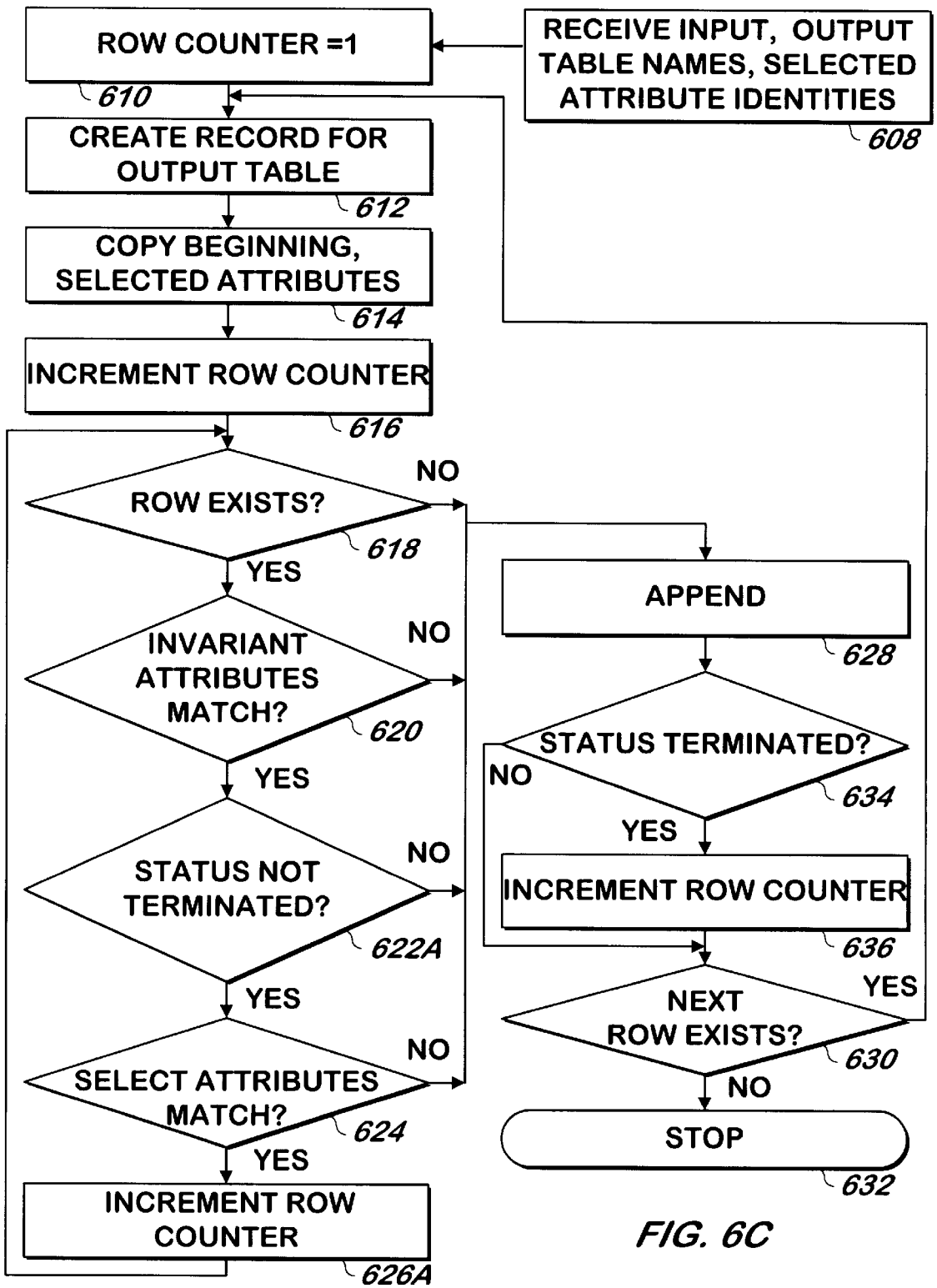
FIG. 6C is a flowchart illustrating a method of performing a temporal normalization on a table in a dimensional database containing a beginning effective time attribute and a status attribute according to one embodiment of the present invention.

If the input table does not contain an ending effective time attribute and instead contains a status attribute, the method may be altered to accommodate this change in structure. Referring now to FIG. 6C, a method of performing temporal normalization is shown according to an alternate embodiment of the present invention. Steps 608, 610, 612, 614, 616, 618, 620, 624, 628, 630 and 632 operate as described above with reference to FIG. 6B. Step 622A verifies that the status of the row in the input table corresponding to the row counter is not terminated, and if the status is terminated, the method continues at step 628. In addition, steps 634 and 636 are added between steps 628 and 630. Step 634 identifies whether the status of the row in the input table corresponding to the row counter is terminated. If so, the row counter is incremented 636. Otherwise, the method continues at step 630.

Figure 6D:
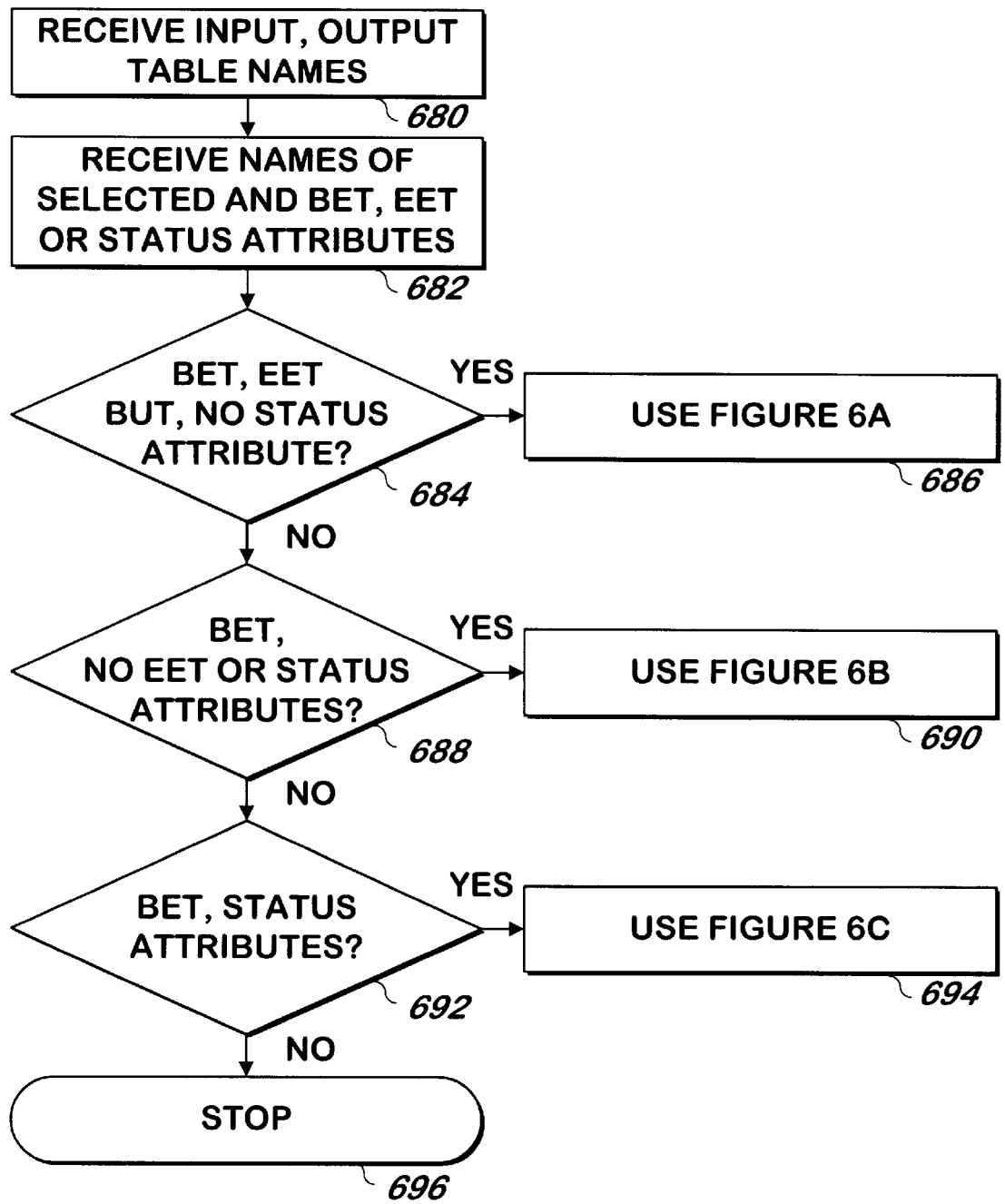
FIG. 6D is a flowchart illustrating a method of selecting a temporal normalization to perform according to one embodiment of the present invention.

In one embodiment, the names of the beginning effective time attribute, ending effective time attribute or status attribute, if such attributes exist, are received in addition to the names of the input and output tables and the selected attribute identifiers. Selection from among the methods of performing temporal normalization described above depends on which of the beginning effective time, ending effective time or status attribute names are received. Referring now to FIG. 6D, a method of selecting a method of performing a temporal projection is shown according to one embodiment of the present invention. The names of the input and output tables are received 680. The names of the selected attributes and the beginning effective time attribute, ending effective time attribute or status attribute are also received 682. In one embodiment, the names of any of these attributes that exist in the input table are received with the other attribute names omitted. If, in step 682, the names of both beginning and ending effective time attributes are received without the name of a status attribute 684, the method described above with reference to FIG. 6A is used to perform the temporal normalization 686. If, in step 682, the name of the beginning effective time attribute is received without the names of the ending effective time or status attribute 688, the method described above with reference to FIG. 6B is used to perform the temporal normalization 690. If, in step 682, the name of the beginning effective time attribute is received with the name of the status attribute 692, the method described above with reference to FIG. 6C is used to perform the temporal projection 694. Otherwise, the method terminates 696.

State Duration

The temporal primitive function of state duration creates in an output table one row for each row in an input table. The input table may be a fact table, a dimension table or any other table in which each row has some or all of the attributes in the record described above with reference to FIG. 2. Each row in the output table contains a single attribute, containing the duration of the corresponding row of the input table. The input table may be any table that contains a beginning and ending effective time attribute, such as a temporal projection table. Thus, state duration may be applied to a dimension table by first performing temporal projection on the dimension table, and then performing state duration on the output of the temporal projection.

Figure 7A:
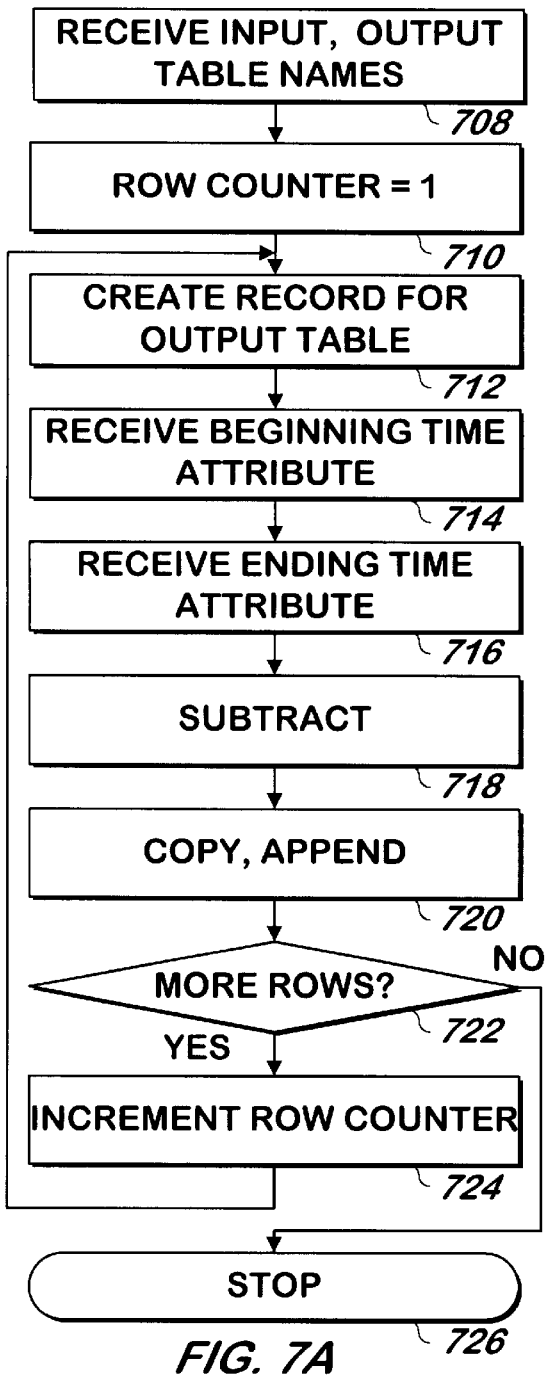
FIG. 7A is a flowchart illustrating a method of performing a state duration identification on a table of a dimensional database according to one embodiment of the present invention.

Referring now to FIG. 7A, a method of performing state duration is shown according to one embodiment of the present invention. The name or other identifier of the input and output tables are received 708. A row counter is initialized to a value of '1' 710. A record is created 710 for the output table containing a duration attribute. The beginning and ending effective time attributes are retrieved from the row of the input table corresponding to the row counter 714, 716. The beginning effective time is subtracted from the ending effective time to create the duration 718. In one embodiment, the attributes received in step 714 and 716 contain a key to a time dimension table. In such embodiment, the subtraction step 718 first looks up the beginning effective time and ending effective time using the keys received in steps 714, 716 and the time dimension table, and subtracts the beginning effective time found in the time dimension table from the ending effective time found in the time dimension table. In such embodiment, step 708 also includes the receipt of a time dimension table identifier or name.

The duration identified in step 718 is copied to the record created in step 712, and this record as modified is appended 720 as the last row of the output table specified in step 708. If there are more rows in the input table 722, the row counter is incremented 724 and in the method continues at step 712. Otherwise, the method terminates 726.

In another embodiment, state duration is performed as a part or an optional part of temporal normalization described above with reference to FIG. 6A. Referring again to FIG. 6A, in such embodiment, each record created in step 612 contains a duration attribute. The duration attribute is calculated by subtracting the time corresponding to the beginning effective time attribute of the record from the time corresponding to the ending effective attribute of the record after step 626, 616 or step 628.

Figure 7B:
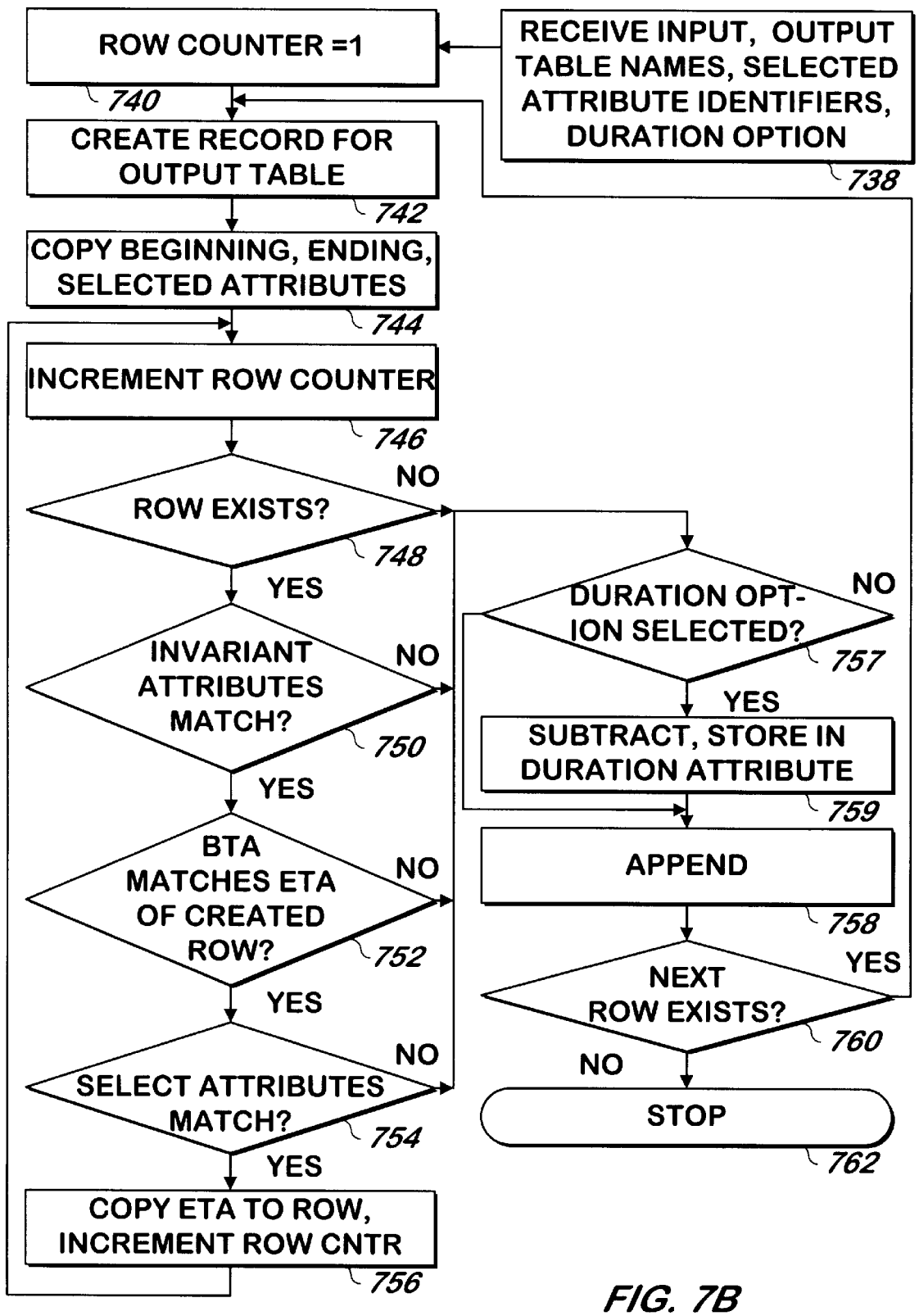
FIG. 7B is a flowchart illustrating a method of performing a temporal normalization and a state duration identification on a table of a dimensional database according to one embodiment of the present invention.

Referring now to FIG. 7B, a method of performing temporal normalization and state duration is shown according to one embodiment of the present invention. Steps 738, 740, 742, 744, 746, 748, 750, 752, 754, 756, 758, 760 and 762 operate as steps 608, 610, 612, 614, 616, 618, 620, 622, 624, 626, 628, 630 and 632, respectively, except as noted below.

Step 738 additionally includes the receipt of a state duration option indicator. Prior to step 758, if the state duration option indicator indicates state duration is selected 757, the duration is calculated by the subtraction described above, and stored into a duration attribute created in the record 759. Otherwise, step 759 is skipped and the method continues at step 758.

In another embodiment, state duration is always performed, and the duration option received in step 738 is not received as a part of step 738, step 757 is omitted, and step 759 is performed unconditionally prior to step 758.

The method described with reference to FIG. 7B may be used in place of the method described with reference to FIGS. 6A or 7A or both.

Transition Detection

The transition detection query primitive function produces one row in an output table for each transition identified in an input table. The input table may be a fact table, dimension table, or any other table containing some or all of the attributes in the record described above with reference to FIG. 2. A transition is defined as beginning at the beginning effective time attribute of a row for which a second function is true, provided that the row follows a row for which a first function is true and both such rows have the same time invariant attribute. The two functions are defined to detect the occurrence of a transition. For example, to detect a change in a marital status attributes, the first function may be defined as "marital status=single" and the second function may be defined as "marital status< > single." If a row is identified for which the first function is true and a row follows this row for which a second function is true, if the time invariant attribute is the same for both rows, a transition is detected and the time invariant attribute and the beginning effective time of the second row is copied to a row of the output table.

Figure 8A:
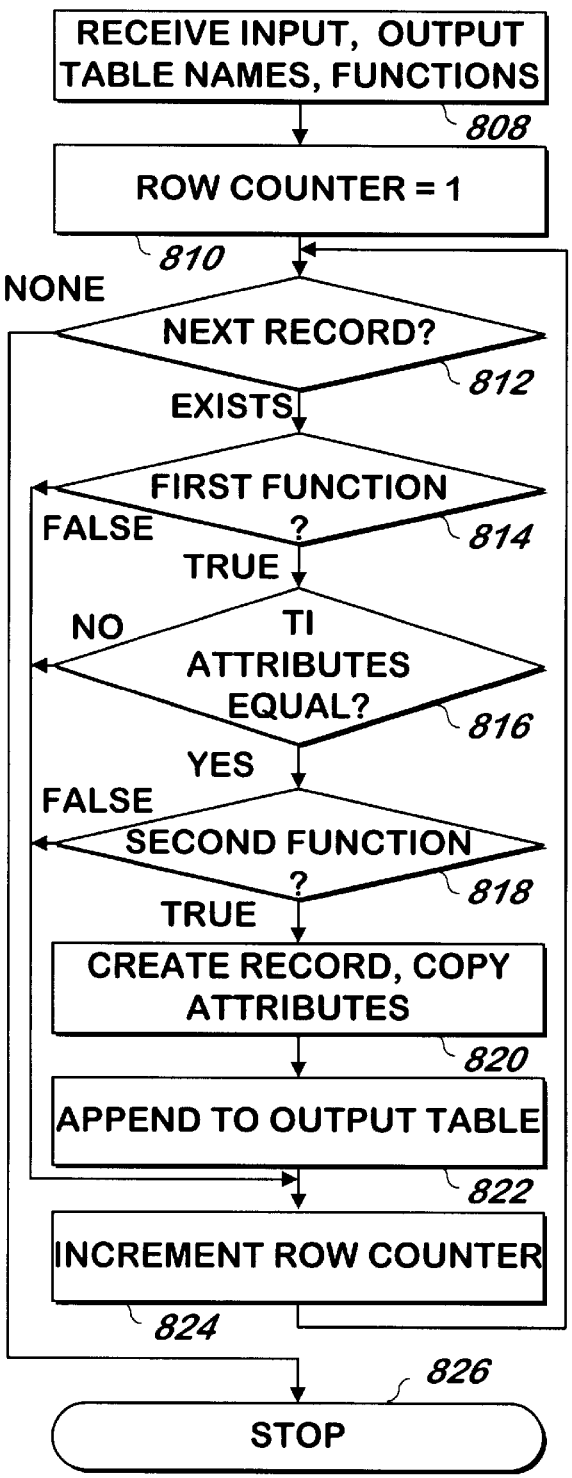
FIG. 8A is a flowchart illustrating a method of performing a transition detection on a table in a dimensional database according to one embodiment of the present invention.

Referring now to FIG. 8A, a method of performing transition detection is shown according to one embodiment of the present invention. The names of the input and output tables are received, and the two functions are received 808. A row counter is initialized to a value of '1' 810. If a row following the row in the input table corresponding to the row counter does not exist 812, the method terminates 826. Otherwise, the first function is applied to the row of the input table corresponding to the row counter and if the first function is true 814, and the row in the input table corresponding to the row counter has a time invariant attribute equal to the time invariant attribute of the following row 816, and the second function applied to the row in the input table following the row corresponding to the row counter is true 818, the time invariant attribute, beginning effective time attribute, and optionally, other attributes, of the row following the row of the input table corresponding to the row counter are copied into a new record 820, which is appended as the last row in the output table 822. The method continues at step 824. If any of the tests in step 812, 814, 816 or 818 result in "none", "false", "no" or "false", respectively, steps 820 and 822 are skipped and the method continues at step 824.

The method shown in FIG. 8A detects transitions occurring only among two adjacent rows of a sorted table. For example, assume a person in the customer table who has a marital status attribute of 'single' in one row, 'engaged' in the next row, and 'married' in the row following. The example functions listed above will detect the transition from single to engaged. However, if the second function is replaced with "marital status=married," no transition will be detected using the method described above with reference to FIG. 8A.

Figure 8B:
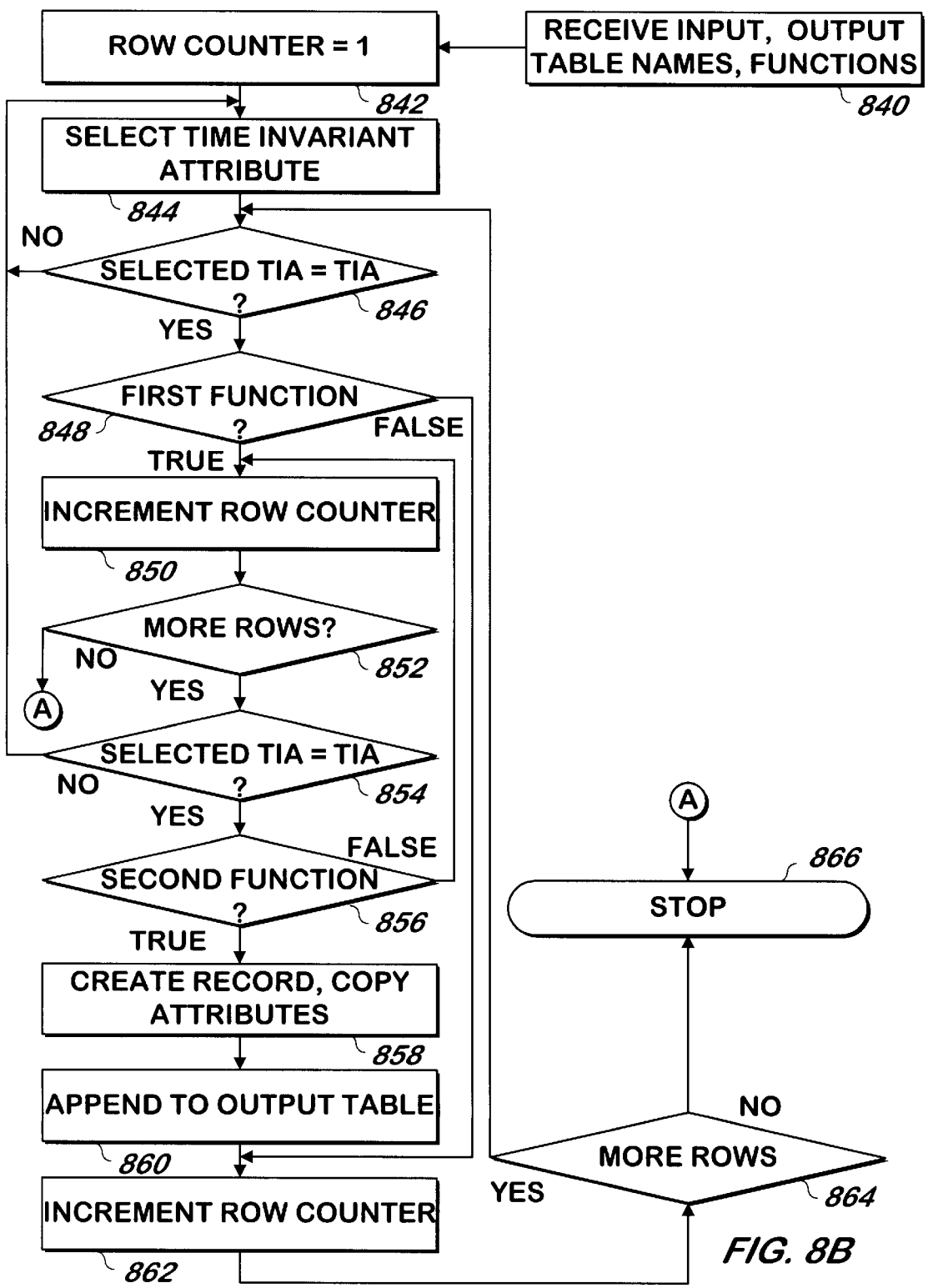
FIG. 8B is a flowchart illustrating a method of performing a transition detection on a table in a dimensional database according to an alternate embodiment of the present invention.

If it desirable to detect transitions which may occur among more than two adjacent rows of the sorted table, another embodiment of the method of the present invention may be used. Referring now to FIG. 8B, a method of performing transition detection is shown according to an alternate embodiment of the present invention.

The names of the input and output tables are received, and the two functions are received 840. A row counter is initialized to a value of '1' 842. The time invariant attribute of the row in the input table corresponding to the row counter is selected 846, for example, by storing it or otherwise referring to it. The first function is applied to the row of the input table corresponding to the row counter. If the first function is false 848, the method continues at step 862 described below to move to the next row of the input table. Otherwise, the row counter is incremented 850. If a row does not exist in the input table corresponding to the row counter 852, the method terminates 866. Otherwise, the row in the input table corresponding to the row counter is checked 854 to determine whether it has a time invariant attribute that matches the time invariant attribute selected in step 844. If not, the method continues at step 844. If so, the second function is applied to the row in the input table corresponding to the row counter. If the application of the second function to this row produces a false result 856, the method continues at step 850. Otherwise, a record is created and the time invariant attribute and the time invariant attribute, beginning effective time, and optionally other attributes, of the row in the input table corresponding to the row counter are copied to this record 858. The record created and modified in step 858 is appended to the output table 860, and the row counter is incremented 862. If a row corresponding to the row counter exists in the input table 864, the method continues at step 846. Otherwise, the method terminates 864.

EXAMPLE

A short illustrative example of the method of the present invention will now be provided. Assume a dimensional database such as the database shown above in FIG. 1C with each of the rows in the customer dimension table arranged as described with respect to the record of FIG. 2 is accessible to the user. The customer dimension table has rows containing the time invariant attribute, TIA, beginning effective time attribute, BTA, ending effective time attribute, ETA and surrogate attribute, Surrogate_Key. Each row of the customer dimension table has a "marital status" attribute, with possible values of 'single' or 'married'.

The fact table contains a "units" attribute containing the number of units in the order, and a customer_key containing a key to the customer table.

The time dimension table contains two columns for each row: a "Date" column containing a date, and a "Time_Key" containing the key to the row.

Assume a user of the database wishes to know the number of units sold to customers who have been married for two or more years at any time. The user may first perform a conventional selection from the customer table, selecting records from the customer table where the marital status attribute is equal to 'Married'. Assume the selection is performed so that the output table of the selection is the customer table. For example, using the conventional SQL query:

SELECT TIA, BTA, ETA FROM customer_dimension WHERE marital_status='Married' (Statement 0)

The user may sort the resulting table as described above and perform a temporal normalization on the resulting table as described above with reference to FIGS. 6A, 6B or 6C, for example using the commands set forth below:

$temporal_{613}$ normalization with
    input table :=$customer_{613}$ dimension
    output table :=normalized_customer_dimension having TIA, BTA and ETA attributes
    selected attributes :=marital status (Statement 1)

The above command performs temporal normalization as described with reference to FIG. 6A on the input table, copying the time invariant attribute, beginning effective time attribute and ending effective time attribute from the customer dimension table into the normalized customer dimension output table, and consolidating rows as described above.

The user next will create (i.e. define) a table in the database having a single column of the same type as the time invariant attributes of the customer dimension table. Assume the user creates this table and calls it "married_customers_table" with the attribute Married_TIA.

The user will then select the time invariant attribute from rows meeting the criteria of having been married for more than two years, and place them into the married_customers table created above. For example, for each row of the normalized_customer_dimension table:

SELECT Date AS StartDate FROM time_dimension WHERE Time_Key=BTA
SELECT Date AS StopDate FROM time_dimension WHERE Time_Key=ETA
IF StopDate-StartDate>2 years
  IF there is not a row in married_customers_table where Married_TIA=TIA
    Append a new row to married_customers_table having Married_TIA=TIA
  ENDIF
ENDIF (Statement 2)

The lookup of the dates in the time dimension table is performed to accommodate the variance in number of days due to leap years. The "IF" statement is performed to eliminate duplicate entries for people who are married for more than two years, then not married, and then married again for more than two years, although as used below, the elimination of the duplicate entries will be seen as not necessary.

Next, the fact table and customer dimension table are joined to produce the result of the temporal query, for example, SELECT Units
FROM fact, customer_dimension
WHERE fact.customer_key=customer_dimension.Surrogate_Key
AND customer_dimension.TIA IN
  (Select married_customers_table.Married_TIA FROM married_customers_table) (Statement 3)

Referring again to FIG. 3A, statements 0, 1, 2, and 3 may be received as a part of a temporal query, and the temporal query is performed as described above to produce the result.

Intermediate Tables and Key Set Generation

It can be helpful to use the output of a temporal query primitive function to generate a table containing keys to one of the dimension or fact tables that match one or more criteria of interest to a user. Such table is known as a key set table. In the example listed above, the WHERE clause in Statement 3 produces a key set table to join with the fact table.

However, if desired, the key set table may be placed into a separate table for use in other statements. This is performed by joining a dimension table with a result of a temporal query primitive function or an intermediate table produced from the result of a temporal query primitive function using a conventional selection, projection or join command. In the example above, the married_customers_table built using statement 2 is an intermediate table produced from the result of the temporal normalization performed in statement 1, and the second SELECT in Statement 3 uses this intermediate table to build another intermediate table.

A key set table could have been produced using the conventional query:

SELECT Surrogate_Key
FROM customer_dimension
WHERE customer_dimension.TIA IN
  (SELECT married_customers_table.TIA FROM married_customers_table)

Apparatus

Figure 9:
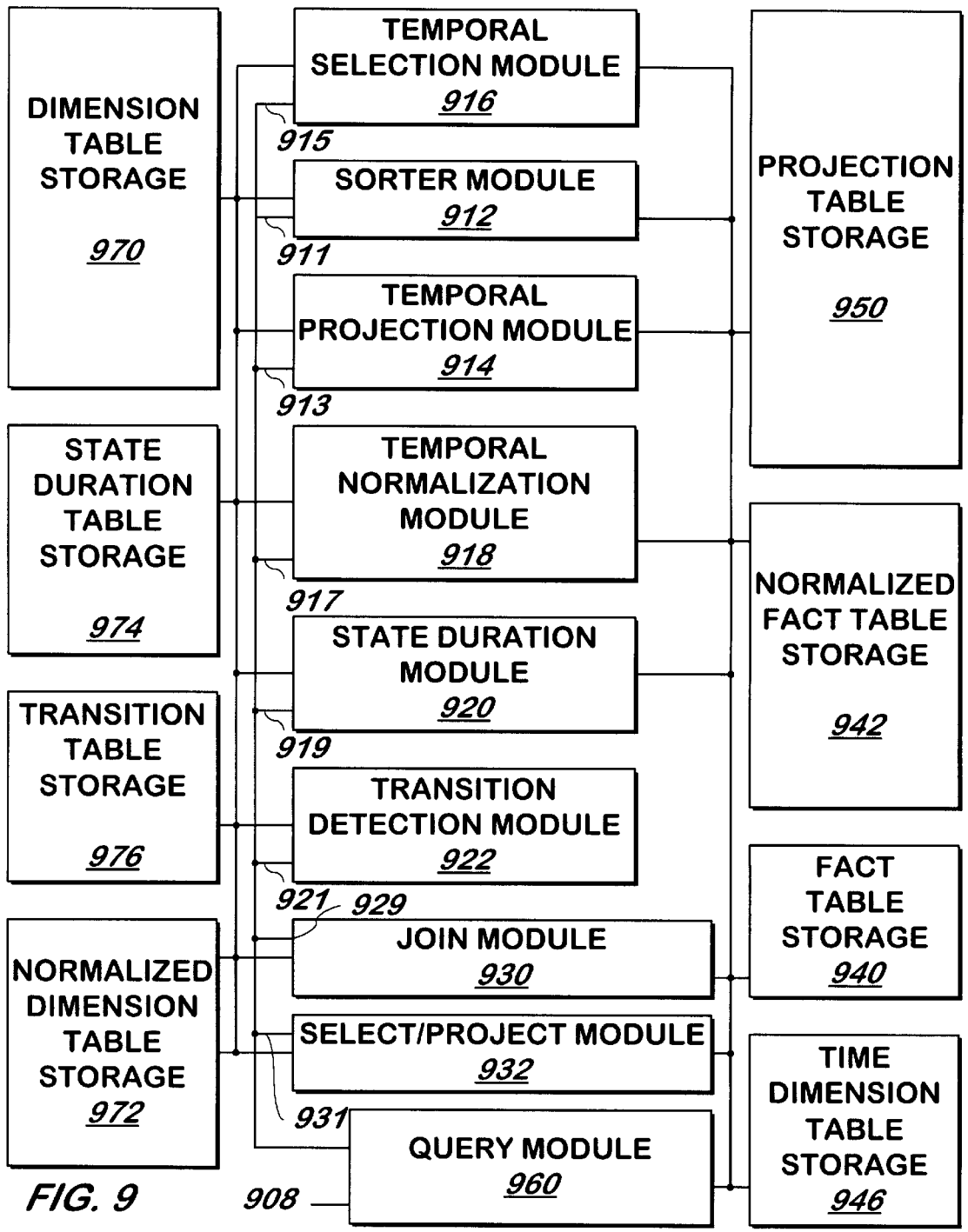
FIG. 9 is a block schematic diagram of an apparatus for performing one or more temporal query primitive functions on one or more tables in a dimensional database and joining the result of temporal query primitive functions or results derived therefrom with other tables of the dimensional database according to one embodiment of the present invention.

Referring now to FIG. 9, a system for selecting records from a fact table of a dimensional database by performing temporal query primitive functions and one or more joins on the tables of a dimensional database is shown according to one embodiment of the present invention. Fact table storage 940 stores the fact table of the dimensional database. Time dimension table storage 946 stores the time dimension table of the dimensional database. Dimension table storage 970 holds one or more remaining dimension tables of the dimensional database. Temporal selection module 916, temporal projection module 914, temporal normalization module 918, state duration module 920, transition detection module 922 perform the corresponding temporal query primitive functions described above.

The system of FIG. 9 performs the functions described above with reference to FIG. 3A. Query module 960 receives at input/output 908 temporal queries in a query language such as SQL or a modified SQL format or non-SQL format such as is described in the OLE DB for OLAP specification at http://www.microsoft.com/data/oledb/olap, the MD-API described at http://www.olapcouncil.org, ODMG 2.0 available at http://www.odmg.org or any other query language that implements conventional selection, conventional projection and conventional joins. Query module 960 parses the query, API or other command received at input/output 908, and directs sorter module 912, temporal projection module 914, temporal selection module 916, temporal normalization module 918, state duration module 920, transition detection module 922 to perform their temporal query primitive functions required by the query received at input/output 908. Query module 960 also directs join module 930 and select/project module 932 to perform functions indicated by the temporal query received at input/output 908.

Query module 960 sends the table names and other information used to perform any of the functions described above and an identifier to identify the modules 916, 912, 914, 918, 920, 922, 930, 932 that will perform the query primitive or other function described herein. In response to the receipt of the corresponding identifier of the modules 916, 912, 914, 918, 920, 922, 930, 932, the modules 916, 912, 914, 918, 920, 922, 930, 932 locates the table or tables having the name received from query module 960, performs the function described below using the information received from query module 960 and stores the result in storage areas 940, 942, 946, 950, 970, 972, 974 and 976, which may be any storage device such as conventional memory or disk, as described herein. Query module then provides the result of the query at input/output 908.

If desired, sorter module 970 sorts the tables in dimension table storage 970 or fact table storage 940. Sorter module 912 receives from query module 960 at input 911 the name of the table to be sorted, the list of attributes or keys, in sort priority order, on which to sort the table, and whether each attribute is to be sorted in ascending or descending order. Sorter module 912 sorts the table stored in dimension table storage 970 or fact table storage 940. As described above, the sorting may be performed by physically sorting the records in the table, or logically sorted by creating in the same storage area as the table an index for the table that relates a numerical sort order to each row of the table.

Temporal projection module 914 receives from query module 960 at input 913 the names of the input and output tables and other inputs to be used for a temporal projection as described above with reference to FIGS. 4A, 4B1, 4B2, 4B3, or 4C. Temporal projection module 914 reads the input table specified at input 913 in dimension table storage 970 or fact table storage 940 and creates in projection table storage 950 a projection table having the name of the output table received at input 913.

In one embodiment, temporal projection module 914 also receives at input 913 the names of the attributes corresponding to the beginning effective time, ending effective time or status. Temporal projection module 914 uses the names of these attributes to identify the proper attributes, and to determine which of the methods of FIGS. 4A, 4B1, 4B2, 4B3 and 4C it will use to perform the temporal projection as described above with reference to FIG. 4D.

Temporal selection module 916 receives from query module 960 at input 915 the function, input table name, the temporal projection table name and other inputs as described above with reference to FIG. 5. Temporal projection module 914 reads the temporal projection table having the name received at input 916 in projection table storage 950 and performs the temporal projection described above with reference to FIG. 5 by selecting the records in the input table stored in dimension table storage 970 or fact table storage 940. If no output table name is specified, temporal selection module 916 selects the rows of the input table by adjusting the pointers for the table as described above. Temporal selection module 916 may optionally receive at input 913 the name of an output table. If the name of an output table is received, instead of selecting records in the input table, temporal selection module creates the output table in dimension table storage 970 by creating separate arrays or dynamic arrays of pointers having the name of the output table and pointing to the records of the input table in dimension table storage 970 that are selected in FIGS. 4A, 4B1, 4B2, 4B3 or 4C.

In one embodiment, if a query received by query module 960 at input/output 908 contains a command requiring temporal selection, and if no projection table exists for the table to be temporally selected, query module 960 first instructs temporal projection module 914 to create such a projection table in projection table storage 950. Query module 960 then directs temporal selection module 916 to utilize the created projection table in projection table storage 950.

Temporal normalization module 918 receives from query module 960 at input 917 the name of the input and output tables and the selected attribute identifiers and other inputs and performs the temporal normalization described above with reference to FIGS. 6A, 7B, 6B or 6C. In one embodiment, temporal normalization module 918 also receives at input 917 the attribute names corresponding to the beginning and ending effective time attributes or the status attribute required to implement the temporal normalization query primitive function. Temporal normalization module 918 selects the method used to perform the temporal normalization query primitive from those of FIGS. 6A, 6B or 6C depending on which attribute names are received as described above with reference to FIG. 6D.

Temporal normalization module 918 reads the input table specified from dimension table storage 970 or fact table storage 940. Temporal normalization module uses the method described above with reference to FIGS. 6A, 6B or 6C to create a table having the output name specified at input 917 in normalized dimension table storage 972 if the input table was located in dimension table storage 970 or normalized dimension table storage 972. Temporal normalization module 918 creates a table having the output name specified at input 917 into normalized fact table storage 942 if the input table was located in fact table storage 940 or normalized fact table storage 942.

State duration module 920 receives from query module 960 at input 919 names of the input and output tables other inputs, and performs the state duration function described above with reference to FIGS. 7A or 7B on the table described at input 919. State duration module 920 reads the input table from dimension table storage 970, normalized dimension table storage 972, fact table storage 940 or normalized fact table storage 942. State duration module 920 creates a state duration table as described above with reference to FIG. 7A and stores the state duration table in state duration table storage 974 with the name as received at input 919. Alternatively, the state duration is stored in the normalized table stored in normalized dimension table storage 972 or normalized fact table storage 942 using the method described above with reference to FIG. 7B.

Transition detection module 922 receives from query module 960 the names of input and output tables and two functions and other inputs at input 921. Transition detection module 922 reads the input table from dimension table storage 970, state duration table storage 974, normalized dimension table storage 972, projection table storage 950, normalized fact table storage 942 or fact table storage 940, and performs the transition detection function described above with reference to FIGS. 8A, 8B or both. Transition detection module creates the output table having the name specified at input 921 in transition table storage 976.

In one embodiment, any of the temporal query primitive modules 914, 916, 918, 920, 922 can obtain input tables from any storages 940, 942, 946, 950, 970, 972, 974, 976.

Select/project module 932 receives from query module 960 conventional selection and projection commands, including the name of the input tables stored in any storage areas 940, 942, 946, 950, 970, 972, 974, 976, attributes and the name of the output table. Select/project module 932 builds the output table by performing the non-temporal selections or projections described with reference to step 310 of FIG. 3A, and may be used in building intermediate tables described in step 321 of FIG. 3A. Output tables are placed into projection table storage 950 if the function is a projection, or the storage areas 940, 942, 946, 950, 970, 972, 974, 976 from which the input table was retrieved.

Join module 930 receives at input 929 the name of any two tables in fact table storage 940 dimension table storage 970, state duration table storage 974, transition table storage 976, normalized dimension table storage 972, projection table storage 950, normalized fact table storage 942, or time dimension table storage 946. Join module 930 receives at input 929 the names and attributes or keys of the tables to join. Join module 930 performs the join described above with reference to FIG. 3B, selecting the records as described above. In one embodiment, join module 930 provides conventional join capabilities, such as those found in the commercially available Oracle or Access database products.

In one embodiment, join module 930 receives at input 929 the name of an output file. Instead of selecting records from the input table, join module 930 creates in fact table storage 940 an output table having the name received at input 929 with records selected from the fact table in fact table storage 940.

As used herein, the phrase "one selected from", and the like does not necessarily imply a database selection described above.

What is claimed is:

1. One or more computer memories collectively containing a dimensional database data structure for resolving temporal queries, comprising:

a time dimension table whose rows each represent a time and are each uniquely identified by a time key;

a second dimension table whose rows each represent one state of a time-variable attribute of a particular item, each row containing an item identifier for the item, a time-variable attribute value, and a time key identifying a row of the time dimension table representing a time at which the time-variable attribute value is effective for the item; and a fact table whose rows each contain an item identifier identifying an item to which the row relates, such that a temporal query specifying a condition of the time-variable attribute and effective time may be resolved by using the time dimension table to identify rows of the second dimension table satisfying the condition, generating an intermediate table whose rows each contain an item identifier from an identified row of the second dimension table, and joining the intermediate table and the fact table.

2. The computer memories of claim 1 wherein the time key of each row of the second dimensional table identifies a row of the time dimension table representing a time at which the time-variable attribute value is first effective for the item.

3. The computer memories of claim 1 wherein the time key of each row of the second dimensional table identifies a row of the time dimension table representing a time at which the time-variable attribute value is last effective for the item.

4. A method in a computer system for resolving a temporal queries in a dimensional database, comprising:

receiving a temporal query specifying a condition of the time-variable attribute and effective time;

accessing the dimensional database, the dimensional database comprising a time dimension table, a second dimension table, and a fact table, the time dimension table having rows that each represent a time and are each uniquely identified by a time key, the second dimension table having rows that each represent one state of a time-variable attribute of a particular item, each row of the second dimension table containing an item identifier for the item, a time-variable attribute value, and a time key identifying a row of the time dimension table representing a time at which the time-variable attribute value is effective for the item, the fact table having rows that each contain an item identifier identifying an item to which the row relates;

using the time dimension table to identify rows of the second dimension table satisfying the condition;

generating an intermediate table comprising rows, each of said rows comprising an item identifier from an identified row of the second dimension table; and joining the intermediate table and the fact table.

5. A computer-readable medium whose contents cause a computer system to resolving a temporal queries in a dimensional database by:

receiving a temporal query specifying a condition of the time-variable attribute and effective time;

accessing the dimensional database, the dimensional database comprising a time dimension table, a second dimension table, and a fact table, the time dimension table having rows that each represent a time and are each uniquely identified by a time key, the second dimension table having rows that each represent one state of a time-variable attribute of a particular item, each row of the second dimension table containing an item identifier for the item, a time-variable attribute value, and a time key identifying a row of the time dimension table representing a time at which the time-variable attribute value is effective for the item, the fact table having rows that each contain an item identifier identifying an item to which the row relates;

using the time dimension table to identify rows of the second dimension table satisfying the condition;

generating an intermediate table comprising rows, each of said rows comprising an item identifier from an identified row of the second dimension table; and joining the intermediate table and the fact table.

6. A data processing system for satisfying a temporal query, comprising:

one or more storage devices collectively containing a dimensional database for resolving temporal queries, comprising:

a time dimension table whose rows each represent a time and are each uniquely identified by a time key, a second dimension table whose rows each represent one state of a time-variable attribute of a particular item, each row containing an item identifier for the item, a time-variable attribute value, and a time key identifying a row of the time dimension table representing a time at which the time-variable attribute value is effective for the item, and a fact table whose rows each contain an item identifier identifying an item to which the row relates;

a query receiver that receives temporal queries each specifying a condition of the time-variable attribute and effective time; and a query processing subsystem that satisfies temporal queries received by the query receiver by using the time dimension table to identify rows of the second dimension table satisfying the condition, generating an intermediate table whose rows each contain an item identifier from an identified row of the second dimension table, and joining the intermediate table and the fact table.

7. One or more computer memories collectively containing a dimensional database data structure supporting time-variable attributes, comprising:

a time dimension table whose rows each represent a time and are each uniquely identified by a time key; and a second dimension table whose rows each represent one state of a time-variable attribute of a particular item, each row containing an item identifier for the item, a time-variable attribute value, and a time key identifying a row of the time dimension table representing a time at which the time-variable attribute value is effective for the item; such that the effective time of a time-variable attribute value for a particular row of the second dimension table may be determined by determining the time represented by a row of the time dimension table identified by the time key contained by that row of the second dimension table, and such that the effective times of the time-variable attribute values for a plurality of rows of the second dimension table may be determined by joining the time dimension table and the second dimension table on columns of those tables containing the time keys.

8. A data processing system for supporting time-variable attributes in a dimensional database, comprising:

one or more storage devices collectively containing a dimensional database, comprising:

a time dimension table whose rows each represent a time and are each uniquely identified by a time key, and a second dimension table whose rows each represent one state of a time-variable attribute of a particular item, each row containing an item identifier for the item, a time-variable attribute value, and a time key identifying a row of the time dimension table representing a time at which the time-variable attribute value is effective for the item; and an effective time determination subsystem that determines the effective times of the time-variable attribute values for a plurality of rows of the second dimension table by joining the time dimension table and the second dimension table on columns of those tables containing the time keys.

9. One or more computer memories collectively containing a dimensional database data structure for resolving temporal queries, comprising:

a time dimension table whose rows each represent a time and are each uniquely identified by a time key;

a second dimension table whose rows each represent one state of a time-variable attribute of a particular item, each row containing a time-variable attribute value and an surrogate attribute reflecting both the identity of the item and a time key identifying a row of the time dimension table representing a time at which the time-variable attribute value is effective for the item; and a fact table whose rows each contain a surrogate attribute identifying an item and a time to which the row relates, such that a temporal query specifying a condition of the time-variable attribute and effective time may be resolved by using the time dimension table to identify rows of the second dimension table satisfying the condition, generating an intermediate table whose rows each contain a surrogate attribute from an identified row of the second dimension table, and joining the intermediate table and the fact table on the surrogate attribute.

10. The computer memories of claim 9 wherein the time key of each row of the second dimensional table identifies a row of the time dimension table representing a time at which the time-variable attribute value is first effective for the item.

11. The computer memories of claim 9 wherein the time key of each row of the second dimensional table identifies a row of the time dimension table representing a time at which the time-variable attribute value is last effective for the item.

12. The computer memories of claim 9 wherein, for each row of the second dimension table, the surrogate attribute is a concatenation of an item identifier identifying an item whose state is described by the row and a time key identifying a row of the time dimension table representing a time at which the time-variable attribute value of the row is effective for the item.

13. The computer memories of claim 9 wherein, for each row of the second dimension table, the surrogate attribute is a key identifying a row of a surrogate table containing an item identifier identifying an item whose state is described by the row of the second dimension table and a time key identifying a row of the time dimension table representing a time at which the time-variable attribute value of the row of the second dimension table is effective for the item.

* * * * *